(12) United States Patent
Zhang et al.

(10) Patent No.: US 12,126,201 B2
(45) Date of Patent: *Oct. 22, 2024

(54) BATTERY HOLDER, POWER TRANSFER DEVICE, ELECTRIC VEHICLE AND INSTALLATION METHOD FOR POWER TRANSFER DEVICE

(71) Applicants: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

(72) Inventors: Jianping Zhang, Shanghai (CN); Chunhua Huang, Shanghai (CN); Zhibo Lan, Shanghai (CN)

(73) Assignees: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/156,403

(22) Filed: Jan. 19, 2023

(65) Prior Publication Data

US 2023/0163611 A1    May 25, 2023

Related U.S. Application Data

(63) Continuation of application No. 16/958,763, filed as application No. PCT/CN2018/125679 on Dec. 29, 2018, now Pat. No. 11,588,338.

(30) Foreign Application Priority Data

Dec. 29, 2017  (CN) .......................... 201711482966.3
Dec. 29, 2017  (CN) .......................... 201711486896.9

(51) Int. Cl.
*H02J 7/00*     (2006.01)
*B60K 1/04*     (2019.01)
(Continued)

(52) U.S. Cl.
CPC .............. *H02J 7/0045* (2013.01); *B60K 1/04* (2013.01); *B60L 50/64* (2019.02); *H01M 10/46* (2013.01);
(Continued)

(58) Field of Classification Search
CPC ........ H02J 7/0045; B60K 1/04; H01M 10/46; H01M 50/249; H01M 50/262;
(Continued)

(56) References Cited

U.S. PATENT DOCUMENTS

| | | | |
|---|---|---|---|
| 7,728,546 B2 * | 6/2010 | Tanaka .............. | H01M 10/6553 307/20 |
| 9,248,792 B2 * | 2/2016 | Kawatani ................ | B60L 50/66 |
| 11,588,338 B2 * | 2/2023 | Zhang ................... | H02J 7/0045 |

FOREIGN PATENT DOCUMENTS

DE   102017130261 A1 *  6/2018   .............. B60K 1/04

OTHER PUBLICATIONS

Jun. 21, 2023 First Office Action issued in Vietnamese Patent Application No. 1-2020-04398.
(Continued)

*Primary Examiner* — M Baye Diao

(57) ABSTRACT

Provided are a battery holder, a power transfer device, an electric vehicle and an installation method for electric vehicle. The battery holder includes a fixing bracket, the fixing bracket has an upper-position accommodation cavity, an upper-position sensor is arranged in the upper-position accommodation cavity, the upper-position sensor is used for detecting the supporting portion of the battery pack, so as to determine whether the battery pack has been installed in
(Continued)

place relative to the battery holder in the height direction of the electric vehicle; and/or, the fixing bracket has a front-position accommodation cavity, a front-position sensor is arranged in the front-position accommodation cavity, the front-position sensor is used to detect the supporting portion of the battery pack, so as to determine whether the battery pack is installed in place relative to the battery holder in the length direction of the electric vehicle.

22 Claims, 13 Drawing Sheets

(51) Int. Cl.
*B60L 50/64* (2019.01)
*H01M 10/46* (2006.01)
*H01M 50/244* (2021.01)
*H01M 50/249* (2021.01)
*H01M 50/262* (2021.01)
*H01M 50/264* (2021.01)
*H01R 13/639* (2006.01)

(52) U.S. Cl.
CPC ....... *H01M 50/244* (2021.01); *H01M 50/249* (2021.01); *H01M 50/262* (2021.01); *H01M 50/264* (2021.01); *H01M 2220/20* (2013.01); *H01R 13/639* (2013.01)

(58) Field of Classification Search
CPC ........... H01M 2220/20; H01M 50/244; H01M 50/264; H01M 50/207; H01M 50/271; H01M 50/296; H01M 50/298; H01M 50/569; H01M 50/20; B60L 50/64; B60L 53/80; H01R 13/639; Y02T 10/70; Y02T 10/7072; Y02E 60/10; B60Y 2200/91
USPC ........................................................ 320/113
See application file for complete search history.

(56) References Cited

OTHER PUBLICATIONS

Jul. 17, 2023 First Office Action issued in Indonesian Patent Application No. P00202005565.
Jul. 26, 2023 First Office Action issued in Indian Patent Application No. 202228059591.
Jul. 26, 2023 First Office Action issued in Indian Patent Application No. 202228059601.
Jan. 6, 2023 First Office Action issued in Australian Patent Application No. 2018396985.
Jan. 23, 2023 First Office Action issued in European Patent Application No. 18896986.9.
Feb. 5, 2024 First Office Action issued in Egyptian Patent Application No. PCT 932/2020.
Jun. 5, 2024 Second Office Action issued in Egyptian Patent Application No. PCT 932/2020.

\* cited by examiner

BATTERY HOLDER, POWER TRANSFER DEVICE, ELECTRIC VEHICLE AND INSTALLATION METHOD FOR POWER TRANSFER DEVICE

CROSS REFERENCE TO RELATED APPLICATIONS

This application is a Continuation Application of U.S. application Ser. No. 16/958,763 filed on Oct. 20, 2021, which is a National Stage of PCT Application No. PCT/CN2018/125679, filed on Dec. 29, 2018, which requests the priority of the Chinese patent application with the application date of Dec. 29, 2017 and the application number of CN201711482966.3 and CN201711486896.9. This application refers to the full text of the above-mentioned Chinese patent application.

TECHNICAL FIELD

The present invention relates to the field of electric vehicles, in particularly relates to a battery holder, a power transfer device, an electric vehicle and installation method for electric vehicle.

BACKGROUND

The existing battery pack installation methods of electric vehicles are generally divided into fixed type and replaceable type, in which the fixed battery pack is generally fixed on the vehicle, and the vehicle is directly used as the charging object during charging. The replaceable battery pack is usually installed in a movable way, the battery pack can be removed and replaced at any time.

In the process of replacing a new battery pack, it involves locking and unlocking the battery pack. Generally speaking, the left and right sides of the battery pack are equipped with locking shafts; the lock mechanism is fixed on the battery pack holder to assemble into a power transfer device, and the power transfer device is installed on the chassis of the electric vehicle; the locking shaft and the lock mechanism cooperate to realize the locking of the battery pack.

However, the above structural form has the following defects: only a locking mechanism matched with the locking shaft of the battery pack is arranged on the fixed bracket, and the weight of the battery pack is concentrated on the locking mechanism of the fixed bracket, resulting in the stress concentration of the lock mechanism, the service life of the lock mechanism is low, and the connection strength of the battery pack and the fixed bracket is low.

In the process of replacing a new battery pack, the electrical connection device is also involved. The lock mechanism not only affects the connection between the battery pack and the battery pack holder, but also affects the reliability of the electrical connection between the battery pack and the electrical connection device.

However, in the prior art, the lock mechanism and the electrical connecting device are arranged independently, the lock mechanism might have locked the battery pack in place, while the reliable electrical connection between the battery pack and the electrical connection device is not achieved, or the battery pack and the electrical connection device are connected reliably, but the battery pack is not locked in place. That is to say, it is difficult to realize the synchronous function of the lock mechanism and the electrical connection device in the prior art, and it is easy to affect the efficiency and reliability of the power exchange.

DISCLOSURE OF THE INVENTION

The technical problem to be solved by the present invention is to overcome the defects in the prior art and provide a power transfer device and an installation method thereof.

The present invention solves the technical problem by the following technical scheme:

A battery holder, for being mounted on the body of an electric vehicle to fix a battery pack, the battery holder comprises a fixing bracket and a lock mechanism, the lock mechanism is fixed on the fixing bracket, the battery holder further comprises:

a plurality of supporting devices, the supporting device is fixed on one side of the fixing bracket facing the battery pack, and the plurality of supporting devices provide a plurality of support points to support the battery pack.

In the present scheme, on the basis of matching the lock mechanism with the locking shaft to realize the locking of the battery pack, a plurality of supporting portions are arranged on the battery pack, and the plurality of supporting devices for supporting the supporting portions are arranged on the fixing bracket, the weight of the battery pack can be simultaneously distributed on the plurality of supporting devices and the lock mechanism, the force is more evenly distributed on the fixing bracket, the force applied by the battery pack to the lock mechanism is reduced, the force concentration of the lock mechanism on the fixing bracket is prevented, the service life of the lock mechanism is improved, so as to improve safety performance, and improve the connection strength between the battery pack assembly and the battery holder. In addition, the structure of battery holder is simple and production cost is low, at the same time, over positioning is avoided, thus reducing the risk that the lock mechanism cannot be unlocked.

Preferably, the lock mechanism includes a locking base, the locking base is provided with an opening and a cavity extending from the opening, the opening is used for the locking shaft installed on the battery pack to enter the cavity; the supporting device is provided with a supporting groove, a lower surface of the supporting groove is in the same plane with a lower surface of the cavity.

In the present scheme, the lower surface of the supporting groove and the lower surface of the cavity of the lock mechanism are in the same plane, so that the battery pack can be more firmly fixed in the fixing bracket, so that the battery pack can be stably moved.

Preferably, the supporting device is provided with a supporting groove; the supporting device comprises a supporting base, the supporting base is provided with a supporting opening and a supporting groove which extends from the supporting opening, and the supporting opening is used for a supporting portion mounted on the battery pack to enter the supporting groove.

In the present scheme, when the locking shaft enters the lock mechanism, the supporting portion of the battery pack enters the supporting groove of the battery holder, and at the same time when the locking is in place, the supporting portion is further pressed in the supporting groove of the supporting base, so that the battery pack can be more firmly fixed in the fixing bracket.

Preferably, the fixing bracket has an upper-position accommodation cavity, the upper-position accommodation cavity is located above the supporting opening, an upper-position sensor is arranged in the upper-position accommodation cavity, the upper-position sensor is used for detecting whether the supporting portion of the battery pack has passed through the supporting opening;

and/or, the fixing bracket has a front-position accommodation cavity, the front-position accommodation cavity is located at the front end of the supporting groove, a front-position sensor is arranged in the front-position accommodation cavity, the front-position sensor is used to detect whether the supporting portion of the battery pack has entered a front end of the supporting groove.

In the present scheme, the upper-position sensor detects whether the supporting portion of the battery pack has passed through the supporting opening, so as to determine whether the battery pack has been installed in place relative to the battery holder in the height direction of the electric vehicle; the front-position sensor detect whether the supporting portion of the battery pack has entered the front end of the supporting groove, thus, it can be determined whether the battery pack is installed in place relative to the battery holder in the length direction of the electric vehicle, so that the electric vehicle can be ensure to be driven under the condition that the battery pack is installed in place and improve the safety of the electric vehicle.

Preferably, the supporting device further comprises an elastic part, the elastic part is at least partially located in the supporting groove, and the elastic part is used for butting the supporting portion of the battery pack. In the present scheme, the elastic part is not necessary to be in contact with the support, but once in contact, the rigid impact between the supporting portion and the supporting base can be prevented.

Preferably, the elastic part comprises an elastic pad, an elastic handle and an elastic head connected in sequence; the elastic pad is located in the supporting groove, the elastic pad is used for abutting against the supporting portion of the battery pack; the elastic handle passes through the supporting base, and a wall portion of the supporting base is clamped between the elastic pad and the elastic head. In the present scheme, in this way, the entire elastic part can be stably installed on the supporting base.

Preferably, the supporting base is provided with a locating hole, the supporting device further includes a dowel pin, the dowel pin is partially located outside the locating hole, and the dowel pin is in interference fit with the locating hole;

and/or, the supporting base is provided with a mounting hole, the mounting hole is a threaded hole, the supporting base can be detachably connected to the fixing bracket through the mounting hole;

and/or, the supporting opening is a bell mouth.

In the present scheme, the dowel pin is partially located outside the locating hole, and the dowel pin is in interference fit with the locating hole, when the supporting device is installed on the fixing bracket, the dowel pin can be used for positioning. The mounting hole is a threaded hole, threaded fasteners can be threaded through the mounting holes to mount the supporting device to the fixing bracket. The supporting opening is a bell mouth, which is convenient for the supporting portion to enter the supporting groove.

Preferably, the plurality of supporting devices are distributed on both sides of the fixing bracket in the length direction of the fixing bracket. In the present scheme, the above structural setting mode is adopted, the battery pack can be installed on the battery holder more smoothly.

Preferably, the numbers of supporting devices respectively located on both sides of the fixing bracket are the same, and the supporting devices arranged on both sides of the fixing bracket are one-to-one corresponding and relatively arranged. Preferably, both sides of the fixing bracket in the length direction of the fixing bracket are provided with the lock mechanisms, the supporting device and the lock mechanism which are on the same side are arranged at intervals. Preferably, in the supporting devices and the lock mechanisms which are on the same side, and in the length direction of the fixing bracket, the supporting devices are distributed at both ends of the fixing bracket, the lock mechanisms are located in the middle part of the fixing bracket.

Preferably, at the length direction of the fixing bracket, both sides of the fixing bracket are arranged with two lock mechanisms, the two lock mechanisms on the same side of the fixing bracket are arranged at intervals, and are respectively a primary lock mechanism and a secondary lock mechanism. In the present scheme, the secondary lock mechanism can provide a secondary locking function or a locking protection function for the battery pack, when the primary lock mechanism fails, it is used to prevent the battery pack from falling and improve the safety performance.

Preferably, the primary lock mechanism comprises a locking link, at least one primary locking tongue and at least one primary locking base, the primary locking base is fixed on the fixing bracket, the primary locking base is provided with a primary opening and a primary cavity extending from the primary opening, the primary opening is used for the primary locking shaft installed on the battery pack to enter the primary cavity, the locking link is rotatably connected with the at least one primary locking tongue, the locking link is used to drive the primary locking tongue to rotate under the action of external force, so that the primary locking tongue can rotate relative to the primary locking base to change between a primary unlocking state and a primary locking state, when the primary locking tongue is in the primary locking state, the primary locking tongue can prevent the primary locking shaft from leaving the primary cavity from the primary opening;

and/or, the secondary lock mechanism comprises:
a secondary locking base, the secondary locking base is fixed on the fixing bracket, the secondary locking base is provided with a secondary opening and a secondary cavity extending from the secondary opening, the secondary opening is used for the secondary locking shaft installed on the battery pack to enter the secondary cavity;
a secondary locking tongue, the secondary locking tongue can rotate relative to the secondary locking base to change between an unlocking state and a locking state, the secondary locking tongue includes a secondary locking tongue body and a secondary locking tongue extension portion which are fixedly connected, the secondary locking tongue extension portion is on the outside of the secondary locking base, when the secondary locking tongue is in the locking state, the secondary locking tongue body can prevent the secondary locking shaft from leaving the secondary cavity from the secondary opening; and,
a secondary reset part, the secondary reset part is arranged on the secondary locking base, and the secondary reset part acts on the secondary locking tongue, the secondary reset part is able to be elastically deformed, the secondary reset part is used to rotate the secondary locking tongue in a locking direction to reset from the unlocking state to the locking state.

In the present scheme, in the secondary lock mechanism, by setting the secondary reset part, it is convenient for the secondary locking tongue to reset from the unlocking state to the locking state, making the battery pack easy to install and lock, in addition, under the action of the secondary reset part, the secondary locking tongue will not easily change to the unlocking state and the locking is more reliable; the secondary locking tongue extension portion is arranged outside the secondary locking base, which can realize the rotation of the secondary locking tongue body by acting on the secondary locking tongue extension portion, and it is convenient for unlocking.

Preferably, the fixing bracket comprises a frame and a temporary connector, one side of the frame in the width direction of the fixing bracket has a bracket opening, and the temporary connector is detachably connected to the portions at the two ends of the bracket opening in the frame, and is covered the bracket opening or in the bracket opening;

and/or, the battery holder further includes a quick-change sensor, the quick-change sensor is arranged on the fixing bracket, the quick-change sensor is used to detect the position signal of a power transfer equipment and transmit the position signal to a controller.

In the present scheme, the temporary connector is detachably connected to the portions in the frame at both ends of the bracket opening, when the battery pack and the battery holder are installed to the electric vehicle, the temporary connector can be removed, which is beneficial to reducing the weight of the electric vehicle.

The quick-change sensor is a force off high-voltage sensor, which can detect the position signal of the power transfer equipment. When the power transfer equipment has reached the preset setting, the quick-change sensor transmits the detected signal to the controller, so as to perform a power off operation on the battery pack, and to ensure that the battery pack is replaced in the case of power failure and improve its safety performance.

The present invention further provides a power transfer device, characterized in that the power transfer device includes the battery holder as described above, the fixing bracket forms a battery pack containment cavity for containing the battery pack, two sides of the battery pack are provided with locking shafts, and the lock mechanism is fixed on two sides of the battery pack containment cavity, the power transfer device further comprises:

an electrical connector of the vehicle side, the electrical connector of the vehicle side is arranged in the battery pack containment cavity, and the electrical connector of the vehicle side faces the electrical connector of the battery side of the battery pack, both of the electrical connector of the vehicle side and the electrical connector of the battery side have a plurality of corresponding poles;

wherein when the locking shaft of the battery pack rises in place in the lock mechanism along the height direction of the battery pack, the distance between the locking shaft and the lock point along the length of the battery pack in the lock mechanism is greater than the gap between the electrical connector of the battery side and the electrical connector of the vehicle side along the length direction of the battery pack;

when the locking shaft reaches the locking point of the lock mechanism, the pole of the electrical connector of the battery side is abutting against the pole of the electrical connector of the vehicle side.

In the present scheme, when the locking shaft of the battery pack is locked in place in the lock mechanism, the electrical connector of the battery side can be reliably connected with the electrical connector of the vehicle side, so as to improve the reliability and efficiency of electric vehicle power exchange by using the power transfer device.

Preferably, the distance between the locking shaft and the lock point along the length of the battery pack in the lock mechanism is called a first distance, and the gap between a high-voltage pole of the electrical connector of the battery side and a high-voltage pole of the electrical connector of the vehicle side along the length direction of the battery pack is called a second distance;

the height of the low-voltage pole of the electrical connector of the vehicle side is lower than the height of the high-voltage pole of the electrical connector of the vehicle side, and the height difference between the low-voltage pole of the electrical connector of the vehicle side and the high-voltage pole of the electrical connector of the vehicle side is less than or equal to the difference between the first distance and the second distance;

or, the height of the low-voltage pole of the electrical connector of the battery side is lower than the height of the high-voltage pole of the electrical connector of the battery side, and the height difference between the low-voltage pole of the electrical connector of the battery side and the high-voltage pole of the electrical connector of the battery side is less than or equal to the difference between the first distance and the second distance.

In the present scheme, the relationship between the height difference and the difference makes the high voltage first connected and the low voltage second connected when the electrical connector of the vehicle side is connected with the electrical connector of the battery side. As long as the low voltage contacts, the contactor control switch in the battery pack can output the high voltage. In addition, when the connection between the electrical connector of the vehicle side and the electrical connector of the battery side is disconnected, the low-voltage firstly disconnects to control the high-voltage disconnection, so as to prevent the pole arcing sintering and other adverse phenomena from happening due to the high-voltage not being disconnected.

Preferably, the range of height difference between the low-voltage pole of the electrical connector of the vehicle side and the high-voltage pole of the electrical connector of the vehicle side is 0-2 mm.

Preferably, the distance between the locking shaft and the lock point along the length of the battery pack in the lock mechanism is called the first distance, and the gap between a high-voltage pole of the electrical connector of the battery side and a high-voltage pole of the electrical connector of the vehicle side along the length direction of the battery pack is called the second distance;

the height of the low-voltage pole of the electrical connector of the vehicle side is lower than the height of the high-voltage pole of the electrical connector of the vehicle side, and the height of the low-voltage pole of the electrical connector of the battery side is lower than the height of the high-voltage pole of the electrical connector of the battery side;

the sum of the height difference between the low-voltage pole of the electrical connector of the vehicle side and the high-voltage pole of the electrical connector of the vehicle side and the height difference between the low-voltage pole of the electrical connector of the battery side and the high-voltage pole of the electrical connector of the battery side is less than or equal to the difference between the first distance and the second distance.

In the present scheme, the relationship between the height difference and the difference makes that the high voltage is connected before the low voltage second is connected when the electrical connector of the vehicle side is connected with the electrical connector of the battery side. As long as the low voltage contacts, a contactor control switch in the battery pack can output high voltage. In addition, when the connection between the electrical connector of the vehicle side and the electrical connector of the battery side is disconnected, the low-voltage firstly disconnects the high-voltage, so as to prevent the pole arcing sintering and other adverse phenomena from happening due to the high-voltage not being disconnected.

Preferably, the electrical connector of the vehicle side is used for floating electric connection with the electrical connector of the battery side;
preferably, the high-voltage pole of the electrical connector of the vehicle side has an electrical contact end and a wiring terminal;
wherein the end face of the electrical contact end of the high-voltage pole is provided with a groove, the groove is concave inwards along the axial direction of the high-voltage pole, the groove is embedded with a conductive elastic part, and the conductive elastic part protrudes from a contact surface of the electrical contact end; preferably, the conductive elastic part is a conductive spring.

Preferably, the lock mechanism includes a locking base, the locking base is provided with an opening and a cavity extending from the opening, the opening is used for the locking shaft to enter the cavity;
the battery pack holder is provided with an upper-position accommodating cavity, the upper-position accommodating cavity is located above the opening, the upper-position accommodating cavity is provided with an upper-position sensor; the upper-position sensor is used to detect whether the locking shaft has passed through the opening, and to detect whether the locking shaft has risen in place in the lock mechanism along the height direction of the battery pack;
and/or, the battery pack holder is provided with a front-position accommodating cavity, the front-position accommodating cavity is located at the front end of the cavity, the front-position accommodating cavity is provided with a front-position sensor; the front-position sensor is used to detect whether the locking shaft has entered the front end of the cavity, and to detect whether the locking shaft has been locked in place in the lock mechanism along the length direction of the battery pack.

In the present scheme, the upper-position sensor can detect whether the locking shaft rises in place in the lock mechanism, the front-position sensor can detect whether the locking shaft is locked in place in the front end of the cavity and reaches the locking point, the upper-position sensor and the front-position sensor can improve the locking reliability of the battery pack, which is conducive to improving the electricity connection of the electrical connector of the vehicle side and the electrical connector of the battery side, and further to improve the reliability of the electric vehicle power exchange.

Preferably, both sides of the battery pack holder in the length direction of the battery pack holder are provided with two of the lock mechanisms, and the two lock mechanisms on the same side of the battery pack holder are arranged at intervals, and the two lock mechanisms are respectively a primary lock mechanism and a secondary lock mechanism; the electrical connector of the vehicle side is arranged on one side wall of the battery pack holder along the width direction of the battery pack holder; wherein the length direction of the battery pack holder is parallel to the length direction of the battery pack.

In the present scheme, when the primary lock mechanism fails, the secondary lock mechanism functions to lock the locking shaft of the battery pack and prevent the battery pack from falling off, which is conducive to further improving the reliability of electric vehicle power exchange.

Preferably, the power transfer device further includes a locking protection mechanism, the locking protection mechanism is fixed on the side opposite to the primary lock mechanism on the battery pack holder, and the locking protection mechanism is arranged on the moving path of the locking link to limit the movement of the locking link relative to the primary locking base of the primary lock mechanism;
preferably, the locking protection mechanism can move between a first position and a second position relative to the locking link; wherein when the locking protection mechanism is in the first position, the locking protection mechanism acts on the locking link to limit the movement of the locking link relative to the primary locking base; when the locking protection mechanism is in the second position, the locking protection mechanism is separated from the locking link to allow the movement of the locking link relative to the primary locking base.

In the present scheme, when the primary lock mechanism locks the locking shaft, the locking protection mechanism can restrict the movement of the locking link relative to the primary locking base, thereby improving the locking effect of the primary lock mechanism, so that the primary lock mechanism can lock the locking shaft reliably. Furthermore, it is beneficial to improve the reliability of electric vehicle.

Preferably, the locking protection mechanism includes:
a lower housing, the first lower housing can be detachably connected to a side opposite to the locking shaft in the primary locking base, the inner part of the first lower housing has a holding cavity, and the side wall of the lower housing has a through hole communicated with the holding cavity;
a locking pin, the locking pin is located in the holding cavity, and the locking pin is penetrated in the locking pin, and can switch between an extended state and a retracted state, wherein when the locking pin is in the extended state, the locking pin is in the first position; when the locking pin is in the retracted state, the locking pin is in the second position.

Preferably, the locking protection mechanism further includes: a driving pin, the driving pin acts on the locking pin, and the driving pin can move relative to the locking pin under an action of an external force to be engaged with or separated from the locking pin; wherein when the driving pin is separated from the locking pin, a force is applied to the locking pin along the retraction direction to make the locking pin in the retracted state; when the driving pin is engaged with the locking pin, the locking pin is the extended state.

Preferably, the battery pack holder is further provided with a wire harness, the wire harness is used to transmit the upper-position signal detected by the upper-position sensor and the front-position signal detected by the front-position sensor to the power transfer equipment.

Preferably, the power transfer device further includes a plurality of support structures, the plurality of support structures are fixed on one side of the battery pack holder facing the battery pack, and the plurality of support structures are used to provide a plurality of support points for supporting the battery pack;
preferably, the support structure includes:
a supporting base, the supporting base is provided with a supporting opening and a supporting groove extending from the supporting opening, the supporting opening is used for a support part installed on the battery pack to enter the supporting groove;
preferably, the plurality of support structures are distributed on both sides of the battery pack holder in the length direction of the battery pack holder, and the support structures arranged on the two sides of the battery pack holder are one-to-one corresponding and relatively arranged;
both sides of the battery pack holder in the length direction of the battery pack holder are provided with the lock mechanisms, and the support structures and the lock mechanisms on the same side are interval set.

In the present scheme, the supporting mechanism can support the battery pack, facilitate the installation of the battery pack and the battery pack holder, and improve the locking effect of the lock mechanism, so as to improve the power exchange reliability of the electric vehicle.

Preferably, the battery pack holder further includes a power exchange sensor, the power exchange sensor is arranged on the battery pack holder, the power exchange sensor is used to sense the power transfer equipment and to control the disconnection of the electrical connection between the electrical connector of the vehicle side and the electrical connector of the battery side.

In the present scheme, when the battery pack is removed from the battery pack holder by the power transfer equipment, the power exchange sensor can disconnect the electric connection between the electrical connector of the vehicle side and the electrical connector of the battery side, so as to protect the electric vehicle.

The present invention further provides an installation method of the above-mentioned power transfer device, characterized in that the installation method for electric vehicle includes the following steps:
S1. install the battery pack from the bottom of the battery pack holder along the height direction of the battery pack into the battery pack holder until the locking shaft rises in place in the lock mechanism along the height direction of the battery pack;
S2. move the battery pack forward along its length direction until the locking shaft reaches the locking point in the lock mechanism along the length direction of the battery pack.

The present invention further provides an electric vehicle, the electric vehicle includes a battery pack assembly, the battery pack assembly includes a battery pack and a locking shaft, the locking shaft is mounted on the battery pack, the electric vehicle further comprises the battery holder as described above, the battery pack assembly is mounted on the battery holder, the locking shaft is located in the lock mechanism;
the battery pack assembly further includes a plurality of supporting portion, the plurality of supporting portion are mounted on the battery pack and are provided in one-to-one correspondence with the plurality of support devices, the supporting devices are used to support the supporting portion correspondingly.

In the present scheme, the electric vehicle with the battery holder as above, on the basis of assembling the lock mechanism and the locking shaft to lock the battery pack, a plurality of the supporting portions are mounted on the battery pack to match the plurality of supporting devices on the fixing bracket, the weight of the battery pack can be simultaneously distributed on the plurality of supporting devices and the lock mechanism, the force of the fixing bracket is more evenly, the force applied by the battery pack to the lock mechanism is reduced, the force concentration of the lock mechanism on the fixing bracket is prevented, the service life of the lock mechanism is improved, so as to improve safety performance, and improve the connection strength between the battery pack, battery pack assembly and the battery holder, so as to improve the safety performance of the electric vehicle.

Preferably, the lock mechanism includes a locking base, the locking base is provided with an opening and a cavity extending from the opening, the opening is used for the locking shaft to enter the cavity, the locking shaft is mounted on the cavity;
the supporting device comprises a supporting base, the supporting base is provided with a supporting opening and a supporting groove which extends from the supporting opening, and the supporting opening is used for the supporting portion to enter the supporting groove;
the supporting portion includes a supporting shaft, the supporting shaft is pressed in the supporting base and located in the supporting groove.

In the present scheme, when the locking shaft enters the opening, the supporting shaft enters the supporting opening, when the locking shaft enters the cavity of the lock mechanism, the supporting shaft of the battery pack enters the supporting groove of the battery holder, and when the locking is in place, the supporting shaft is further pressed in the supporting groove of the supporting base, so that the battery pack can be more firmly fixed in the fixing bracket.

Preferably, the supporting portion further includes a shaft sleeve, the shaft sleeve is rotatably sleeved on the supporting shaft. In the present scheme, the shaft sleeve is rotatably sleeved on the supporting shaft, so that the shaft sleeve can roll, thus ensuring multiple installation, reducing wear and improving the service life of the supporting portion.

Preferably, the material of the shaft sleeve is elastic material;
and/or, the supporting portion further comprises a gasket, the gasket is sleeved on the supporting shaft and pressed on one end of the shaft sleeve;
and/or, the supporting shaft comprises a shaft body and a flange portion, the flange portion is coaxially arranged at one end of the shaft body, the shaft sleeve is sleeved on the shaft body, the flange portion is detachably connected to the battery pack.

Preferably, the supporting shaft is provided with an electromagnetic induction component, preferably, the electromagnetic induction component is magnetic steel;
the fixing bracket has an upper-position accommodation cavity, the upper-position accommodation cavity is located above the supporting opening, an upper-position sensor is arranged in the upper-position accommodation cavity acts on the electromagnetic induction component to detect whether the supporting portion of the battery pack has passed through the supporting opening;
and/or, the fixing bracket has a front-position accommodation cavity, the front-position accommodation cavity is located at the front end of the supporting groove, a front-position sensor is arranged in the front-position accommodation cavity, the front-position sensor acts on the electromagnetic induction component to detect whether the supporting portion of the battery pack has entered the front end of the supporting groove.

In the present scheme, the upper-position sensor acts on the electromagnetic induction component to detect whether the supporting portion of the battery pack has passed through the supporting opening. Thus, it can be determined whether the battery pack is installed in place relative to the battery holder in the height direction of the electric vehicle.

The front-position sensor acts on the electromagnetic induction component to detect whether the supporting portion of the battery pack has entered the front end of the supporting groove. Thus, it can be judged whether the battery pack is installed in place relative to the battery holder in the length direction of the electric vehicle, so as to ensure that the electric vehicle can drive when the battery pack is installed in place and improve the safety of the electric vehicle.

Preferably, one end of the supporting shaft far from the battery pack is provided with a concave part, and the electromagnetic induction element is located in the concave part, and the electromagnetic induction component is on the same plane with the two ends of the supporting shaft far away from the battery pack.

Preferably, the supporting portion includes:
a supporting shaft, the supporting shaft is pressed in the supporting device;
a shaft sleeve, the shaft sleeve is rotatably sleeved on the supporting shaft.

Preferably, the electric vehicle further includes a chassis, and the battery holder is fixed on the chassis.

On the basis of meeting the general knowledge in the art, the above preferred conditions can be arbitrarily combined to obtain better examples of the invention.

The positive progress effect of the present invention lies in that:

The battery holder and the electric vehicle including the battery holder of the present invention, on the basis of matching the lock mechanism with the locking shaft to realize the locking of the battery pack, the plurality of supporting portions are arranged on the battery pack, and the plurality of supporting devices for supporting the supporting portions are arranged on the fixing bracket, the weight of the battery pack can be simultaneously distributed on the plurality of supporting devices and the lock mechanism, the force is more evenly applied on the fixing bracket, the force applied by the battery pack to the lock mechanism is reduced, the force concentration of the lock mechanism on the fixing bracket is prevented, the service life of the lock mechanism is improved, so as to improve safety performance, and improve the connection strength between the battery pack assembly and the battery holder. In addition, the structure of battery holder is simple and production cost is low, at the same time, over positioning is avoided, thus reducing the risk that the lock mechanism cannot be unlocked. In the power transfer device of the present invention, when the locking shaft of the battery pack is locked in place in the lock mechanism, the electrical connector of the battery side can be reliably connected with the electrical connector of the vehicle side, so as to improve the reliability and power exchange efficiency of the electric vehicle using the power transfer device.

DESCRIPTION OF SYMBOLS IN THE FIGURES

Figure 1:
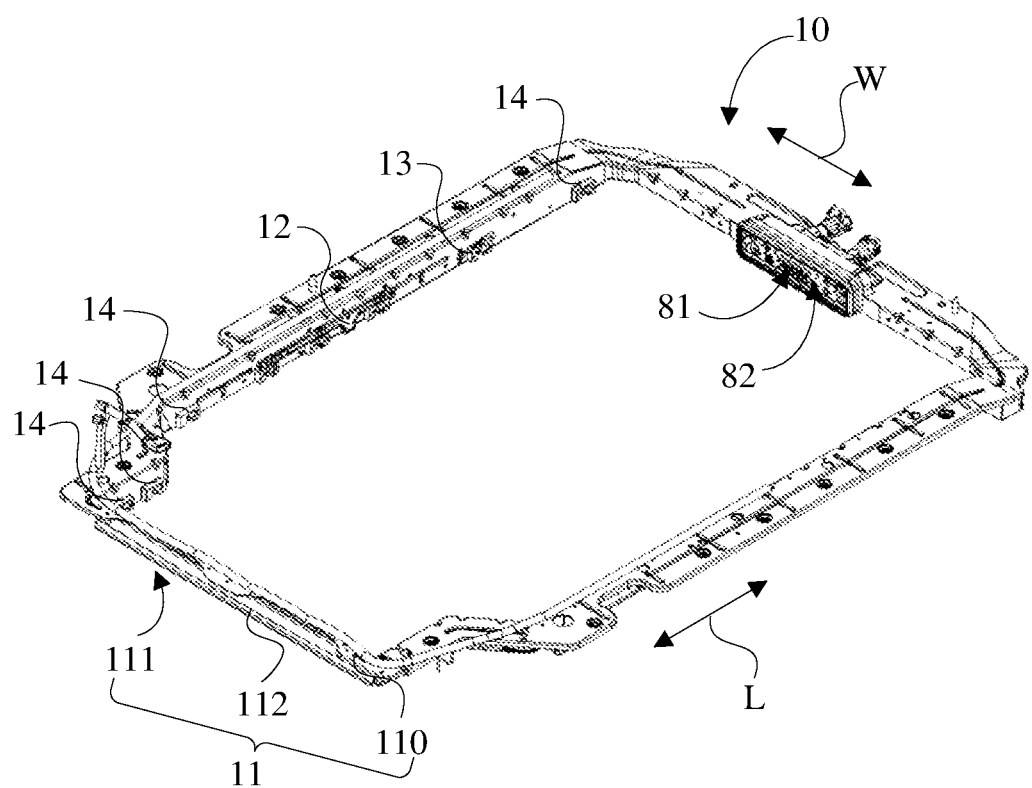
FIG. 1 is a schematic perspective diagram of the battery holder according to the first embodiment of the present invention.

Embodiment 1 battery holder 10; fixing bracket 11; frame 110; bracket opening 111; temporary connector 112; primary lock mechanism 12; locking link 120; primary locking tongue 121; primary locking base 122; primary opening 123; primary cavity 124; secondary lock mechanism 13; secondary locking tongue 130; secondary locking tongue body 1300; secondary locking tongue extension portion 1301; secondary locking base 131; secondary opening 132; secondary cavity 133; secondary reset part 134; supporting device 14; supporting base 140; supporting opening 141; supporting groove 142; elastic part 143; elastic pad 1430; elastic head 1431; locating hole 144; dowel pin 145; mounting hole 146; battery pack assembly 30; battery pack 31; primary locking shaft 32; secondary locking shaft 33; supporting portion 34; supporting shaft 340; shaft body 3400; flange portion 3401; shaft sleeve 341; gasket 342; electromagnetic induction component 343; concave part 344; width direction of fixing bracket W; length direction of fixing bracket L, height direction of the electric vehicle Hv; length direction of the electric vehicle Lv, electric vehicle 1.

Embodiment 2 locking protection mechanism 10; first lower housing 101; first holding cavity 1011; through hole 1012; locking pin 102; executive part 1021; connecting part 1022; second holding cavity 1023; first inclined part 1024; concave part 1025; second electromagnetic induction component 1026; driving pin 103; blocking part 1031; second inclined part 1032; first electromagnetic induction component 104; first elastic element 105; second elastic element 106; second lower housing 107; third holding cavity 1071; upper housing 108; fourth holding cavity 1081; first sensor 1082; second sensor 1083; primary lock mechanism 20; locking link 201; primary locking tongue 202; primary locking base 203; primary cavity 204; unlocking block 205; secondary lock mechanism 30; secondary locking base 301; secondary opening 3011; secondary cavity 3012; secondary locking tongue 302; secondary locking tongue body 3021; secondary locking tongue extension portion 3022; secondary reset part 303; support structure 40; supporting base 401; supporting opening 402; supporting groove 403; electrical connector of the vehicle side 50; wiring terminal 501; electrical contact end 502; battery pack holder 60; hole 601; battery pack containment cavity 602; wire harness 70, low-voltage pole of the electrical connector of the vehicle side 81, high-voltage pole of the electrical connector of the vehicle side 82.

DETAILED DESCRIPTION OF EMBODIMENTS

The present invention will be further described in the way of embodiments, but it is not limited to the scope of embodiments, but the present invention is not hence limited within the range of the embodiments.

Embodiment 1

According to an embodiment of the present invention, FIGS. 1-5 show a schematic structure diagram of a battery holder. As shown in FIGS. 1-5, the battery holder 10 is mounted on the body of a electric vehicle 1 to fix a battery pack 31, so as to install a quick changeable battery pack or a rechargeable battery pack. The battery holder 10 comprises a fixing bracket 11, a lock mechanism and a plurality of supporting devices 14. The lock mechanism is fixed on the fixing bracket 11. The plurality of supporting devices 14 are fixed on one side of the fixing bracket 11 facing the battery pack 31 and provide a plurality of support points to support the battery pack 31.

In the present embodiment, on the basis of matching the lock mechanism with the locking shaft to realize the locking of the battery pack 31, a plurality of supporting portions 34 are arranged on the battery pack 31, and the plurality of supporting devices 14 for supporting the supporting portions 34 are arranged on the fixing bracket 11, the weight of the battery pack 31 can be simultaneously distributed on the plurality of supporting devices 14 and the lock mechanism, the force is more evenly distributed on the fixing bracket 11, the force applied by the battery pack 31 to the lock mechanism is reduced, the force concentration of the lock mechanism on the fixing bracket 11 is prevented, the service life of the lock mechanism is improved, so as to improve safety performance, and improve the connection strength between the battery pack assembly 30 and the battery holder 10. In addition, the structure of battery holder 10 is simple and production cost is low, at the same time, over positioning is avoided, thus reducing the risk that the lock mechanism can not be unlocked.

As shown in FIG. 1, the fixing bracket is a frame structure. The lock mechanism and the plurality of supporting devices 14 are fixed in the frame of the frame structure. Of course, in other embodiments, the fixing bracket 11 can also be a disc-shaped structure with an annular side wall, a cuboid structure with an opening at the bottom or a plate-shaped structure, which does not limit the protection scope of the present invention.

The fixing bracket 11 comprises a frame 110 and a temporary connector 112. One side of the frame 110 in the width direction of the fixing bracket W has a bracket opening 111, and the temporary connector 112 is detachably connected to the portions in the frame 110 at both ends of the bracket opening 111, and covers the bracket opening 111 or is located in the bracket opening 111. When the battery pack 31 and the battery holder 10 are installed to the electric vehicle 1, the temporary connector 112 can be removed, which is beneficial to reducing the weight of the electric vehicle 1.

In addition, the lock mechanism generally includes a locking base, the locking base is provided with an opening and a cavity extending from the opening, the opening is used for the locking shaft installed on the battery pack 31 to enter the cavity. The supporting device 14 is provided with a supporting groove 142, a lower surface of the supporting groove 142 is in the same plane with a lower surface of the cavity. In this way, the battery pack 31 can be more firmly fixed in the fixing bracket 11, so that the battery pack 31 can be stably moved.

In a preferred embodiment, as shown in FIG. 1, in the length direction of the fixing bracket L, both sides of the fixing bracket 11 are provided with lock mechanisms, the supporting devices 14 and the lock mechanisms which are on the same side are arranged at intervals. The length direction of the fixing bracket 11 and the length direction of the electric vehicle Lv are approximately same.

Further preferably, in the supporting devices 14 and the lock mechanisms which are on the same side, and in the length direction of the fixing bracket L, the supporting devices 14 are distributed at both ends of the fixing bracket 11, and the lock mechanisms are located in the middle part of the fixing bracket 11.

Figure 2:
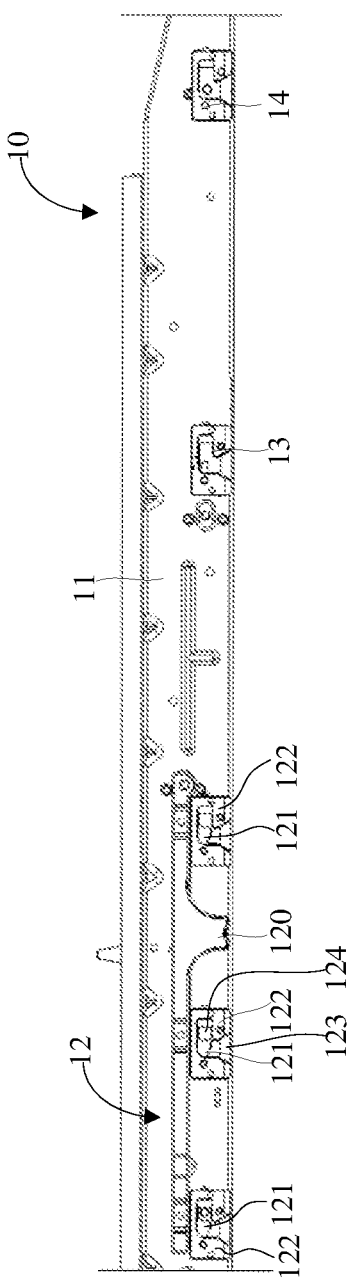
FIG. 2 is a partial schematic diagram of the battery holder according to the first embodiment of the present invention.
Figure 3:
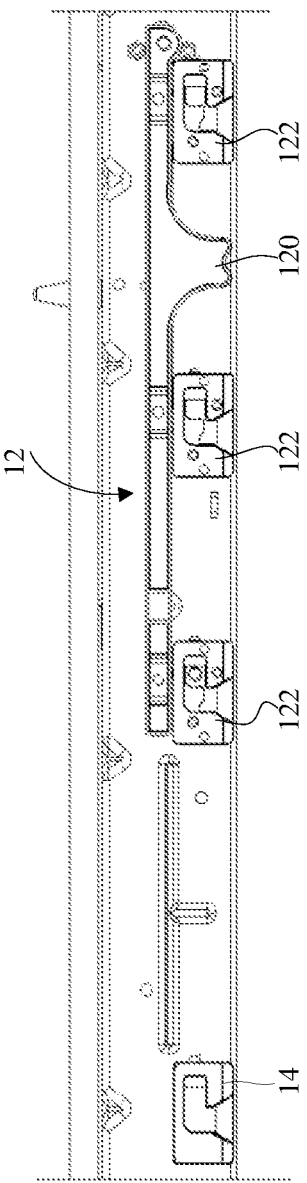
FIG. 3 is another partial schematic diagram of the battery holder according to the first embodiment of the present invention, wherein the part coincides with FIG. 2.

As shown in FIGS. 1-3, in the length direction of the fixing bracket L, both sides of the fixing bracket 11 are all arranged with two lock mechanisms. The two lock mechanisms on the same side of the fixing bracket 11 are arranged at intervals, and are respectively a primary lock mechanism 12 and a secondary lock mechanism 13; wherein the secondary lock mechanism 13 and the primary lock mechanism 12 are used in cooperation; the primary lock mechanism 12 can refer to the "locking device" disclosed in the Chinese patent application with the publication number of CN106427514A. The secondary lock mechanism 13 can provide a secondary locking function or a locking protection function for the battery pack 31, when the primary lock mechanism 12 fails, it is used to prevent the battery pack 31 from falling and improve the safety performance.

In addition, the primary lock mechanism 12 comprises a locking link 120, at least one primary locking tongue 121 and at least one primary locking base 122. The primary locking base 122 is fixed on the fixing bracket 11. In the present embodiment, three primary locking bases 122 and three primary locking tongues 121 are respectively arranged on both sides of the frame of the fixing bracket 11. FIG. 2 and FIG. 3 are partial schematic diagrams on one side.

As shown in FIGS. 2-3, the primary locking base 122 is provided with a primary opening 123 and a primary cavity 124 extending from the primary opening 123, the primary opening 123 is used for the primary locking shaft 32 installed on the battery pack 31 to enter the primary cavity 124. The locking link 120 is rotatably connected with at least one primary locking tongue 121, which is used to drive the primary locking tongue 121 to rotate under the action of external force, so that the primary locking tongue 121 can rotate relative to the primary locking base 122 to change between a primary unlocking state and a primary locking state. When the primary locking tongue 121 is in the primary locking state, the primary locking tongue 121 can prevent the primary locking shaft 32 from leaving the primary cavity 124 from the primary opening 123. The "primary locking state" refers to a locking state of the primary lock mechanism 12; the "primary unlocking state" refers to an unlocking state of the primary lock mechanism 12.

Figure 4:
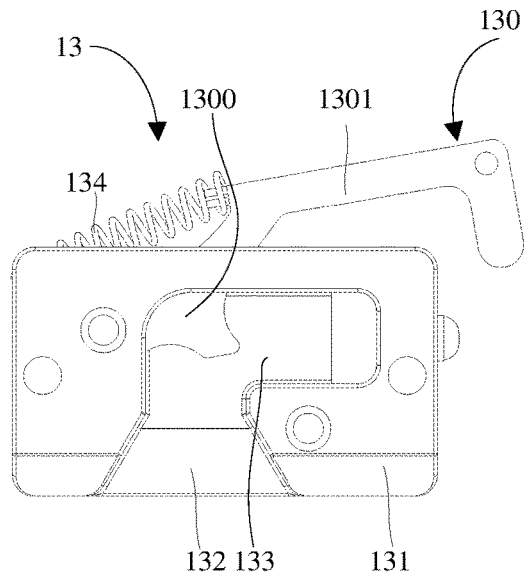
FIG. 4 is a schematic structure diagram of the secondary lock mechanism of the battery holder according to the first embodiment of the present invention.

As shown in FIG. 4, the secondary lock mechanism 13 comprises a secondary locking base 131, a secondary locking tongue 130 and a secondary reset part 134. The secondary locking base 131 is fixed on the fixing bracket 11. The secondary locking base 131 is provided with a secondary opening 132 and a secondary cavity 133 extending from the secondary opening 132, the secondary opening 132 is used for the secondary locking shaft 33 (the structure is the same as or similar to the primary locking shaft 32) installed on the battery pack 31 to enter the secondary cavity 133.

The secondary locking tongue 130 can rotate relative to the secondary locking base 131 to change between an unlocking state and a locking state. The secondary locking tongue 130 includes a secondary locking tongue body 1300 and a secondary locking tongue extension portion 1301 which are fixedly connected, the secondary locking tongue extension portion 1301 is on the outside of the secondary locking base 131. When the secondary locking tongue 130 is in the locking state, the secondary locking tongue body 1300 can prevent the secondary locking shaft 33 from leaving the secondary cavity 133 from the secondary opening 132.

The secondary reset part 134 is arranged on the secondary locking base 131, and the secondary reset part 134 acts on the secondary locking tongue 130. The secondary reset part 134 is able to be elastically deformed, the secondary reset part 134 is used to rotate the secondary locking tongue 130 in a locking direction to reset from the unlocking state to the locking state.

In the secondary lock mechanism 13, by setting the secondary reset part 134, it is convenient for the secondary locking tongue 130 to reset from the unlocking state to the locking state, making the battery pack 31 easy to install and lock, in addition, under the action of the secondary reset part 134, the secondary locking tongue 130 will not easily change to the unlocking state and the locking is more reliable; the secondary locking tongue 130 extension portion is arranged outside the secondary locking base 131, which can realize the rotation of the secondary locking tongue 130 body by acting on the secondary locking tongue 130 extension portion, and it is convenient for unlocking.

In the present embodiment, as shown in FIGS. 1-5, the lower surface of the supporting groove 142 is in the same plane with a lower surface of the primary cavity 124 and the secondary cavity 133. The lower surface of the supporting groove 142, the lower surface of the primary cavity 124 and the lower surface of the secondary cavity 133 all refer to the surface close to the ground during use, which bear the support function of the supporting portion 34 of the battery pack 31, the primary locking shaft 32 and the secondary locking shaft 33, the three are located in the same plane which can make the battery pack 31 move smoothly.

In a preferred embodiment, the plurality of supporting devices 14 are distributed on both sides of the fixing bracket 11 in the length direction of fixing bracket L. This enables the battery pack 31 to be more smoothly mounted on the battery holder 10. The numbers of the supporting devices 14 respectively located on both sides of the fixing bracket 11 are the same, and the supporting devices 14 arranged on both sides of the fixing bracket 11 are one-to-one corresponding and relatively arranged.

In the present embodiment, the supporting device 14 is similar to the structure of the primary locking base 122 and the secondary locking base 131, but it does not have a function of locking and only serves as a supporting platform for the battery pack 31. In other embodiments, other similar supporting mechanisms with supporting platforms may be applicable. The number of the supporting devices 14 can be adjusted according to the actual weight of the battery pack 31, preferably the average weight supported by each supporting device 14 does not exceed 25 Kg.

Figure 5:
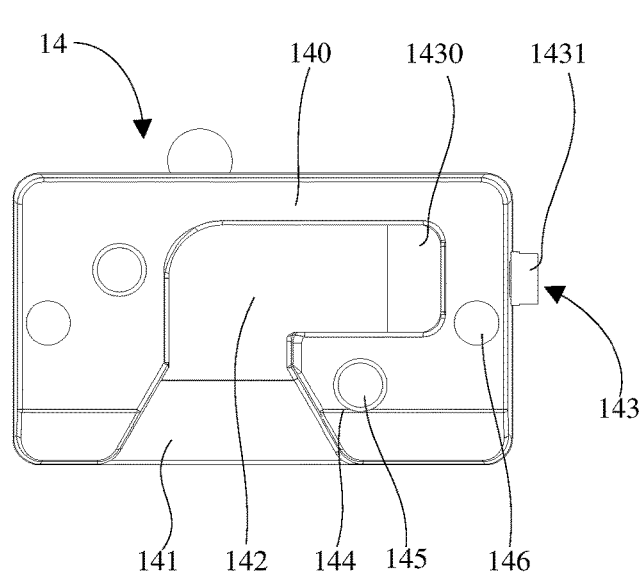
FIG. 5 is a schematic structure diagram of the supporting device of the battery holder according to the first embodiment of the present invention.

As shown in FIG. 5, the supporting device 14 comprises a supporting base 140, the supporting base 140 is provided with a supporting opening 141 and a supporting groove 142 which extends from the supporting opening 141, and the supporting opening 141 is provided for the supporting portion 34 mounted on the battery pack 31 to enter the supporting groove 142.

When the locking shaft enters the lock mechanism (in the present embodiment, the primary locking shaft 32 enters the primary lock mechanism 12, the secondary locking shaft 33 enters the secondary lock mechanism 13), the supporting portion 34 of the battery pack 31 enters the supporting groove 142 of the battery holder 10, and at the same time when the locking is complete, the supporting portion 34 is also pressed in the supporting groove 142 of the supporting base 140, so that the battery pack 31 can be more firmly fixed in the fixing bracket 11.

In addition, the supporting device 14 further comprises an elastic part 143, the elastic part 143 is at least partially located in the supporting groove 142, and the elastic part 143 is used for abutting against the supporting portion 34 of the battery pack 31. The elastic part 143 is not necessary to be in contact with the support 34, but once in contact, the rigid impact between the supporting portion 34 and the supporting base 140 can be prevented.

Specifically, the elastic part 143 comprises an elastic pad 1430, an elastic handle (not shown), and an elastic head 1431 that are sequentially connected. The elastic pad 1430 is located in the supporting groove 142, and is used for abutting against the supporting portion 34 of the battery pack 31. The elastic handle passes through the supporting base 140, and a wall portion of the supporting base 140 is clamped between the elastic pad 1430 and the elastic head 1431. In this way, the entire elastic part 143 can be stably installed on the supporting base 140. The elastic part 143 is preferably made of rubber.

Further, the supporting base 140 is provided with a locating hole 144. The supporting device 14 further includes a dowel pin 145. The dowel pin 145 is partially located outside the locating hole 144, and the dowel pin 145 is in interference fit with the locating hole 144. When the supporting device 14 is installed on the fixing bracket 11, the dowel pin 145 can be used for positioning.

The supporting base 140 is provided with a mounting hole 146, the mounting hole 146 is a threaded hole, the supporting base 140 can be detachably connected to the fixing bracket 11 through the mounting hole 146. The supporting opening 141 is a bell mouth, which is convenient for the supporting portion 34 to enter the supporting groove 142.

As shown in FIGS. 1-3, 5, 20 and 21, the fixing bracket 11 has an upper-position accommodation cavity (not shown), which is located above the supporting opening 141. An upper-position sensor (not shown) is arranged in the upper-position accommodation cavity to detect whether the supporting portion 34 of the battery pack 31 has passed through the supporting opening 141, so as to determine whether the battery pack 31 has been installed in place relative to the battery holder 10 in the height direction of the electric vehicle Hv.

The fixing bracket 11 has a front-position accommodation cavity (not shown), which is located at a front end of the supporting groove 142. The front end refers to the position close to the front of the electric vehicle 1 in the length direction. A front-position sensor (not shown) is arranged in the front-position accommodation cavity, which is used to detect whether the supporting portion 34 of the battery pack 31 has entered the front end of the supporting groove 142. Thus, it can determine whether the battery pack 31 is installed in place relative to the battery holder 10 in the length direction of the electric vehicle Lv, so that the electric vehicle 1 can be ensure to be driven under the condition that when the battery pack 31 is installed in place, which improves the safety of the electric vehicle 1.

The battery holder 10 further includes a quick-change sensor (not shown), which is arranged on the fixing bracket 11. The quick-change sensor is used to detect a position signal of a power transfer equipment and transmit the position signal to a controller. The quick-change sensor is a force off high-voltage sensor, which can detect the position signal of the power transfer equipment. When the power transfer equipment has reached the preset setting, the quick-change sensor transmits the detected signal to the controller, so as to perform a power off operation on the battery pack 31, and to ensure that the battery pack 31 is replaced in the case of power failure and improve its safety performance.

Figure 6:
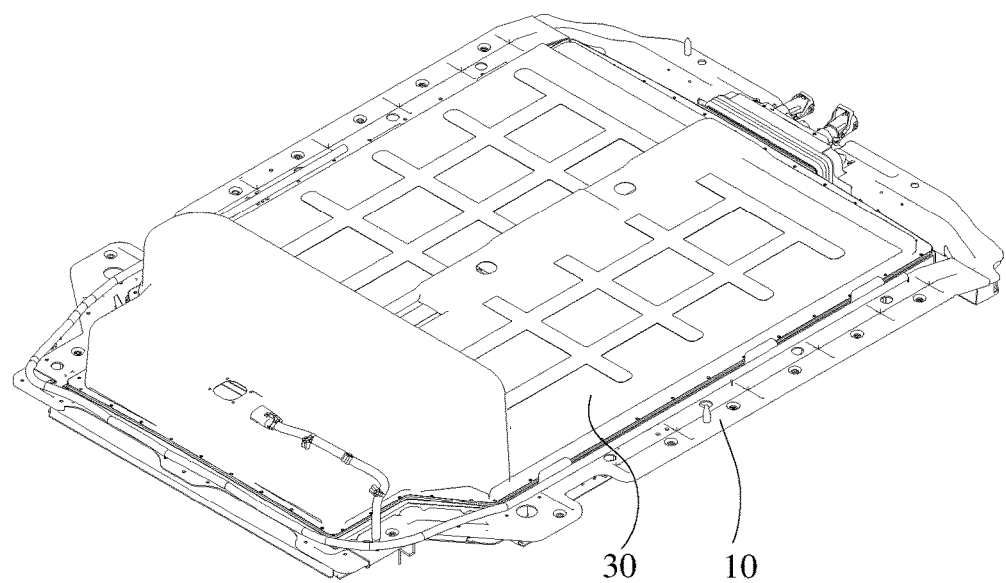
FIG. 6 is a schematic perspective diagram of assembly of a battery pack assembly and a battery holder of an electric vehicle according to the first embodiment of the present invention.
Figure 20:
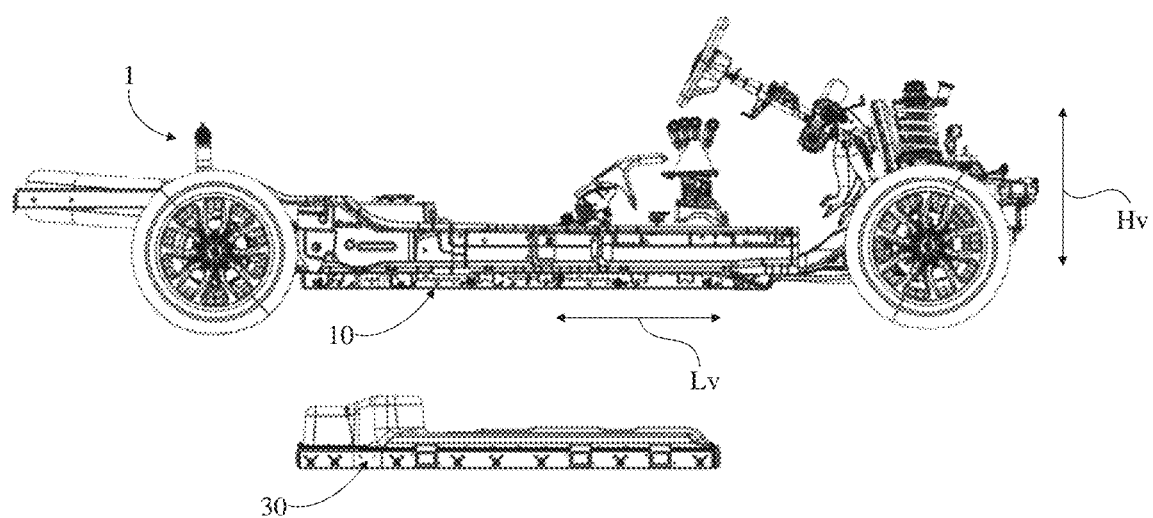
FIG. 20 is a schematic diagram of the structure of an electric vehicle, where the battery holder is installed on the electric vehicle, and the battery pack assembly is separated from the battery holder.
Figure 21:
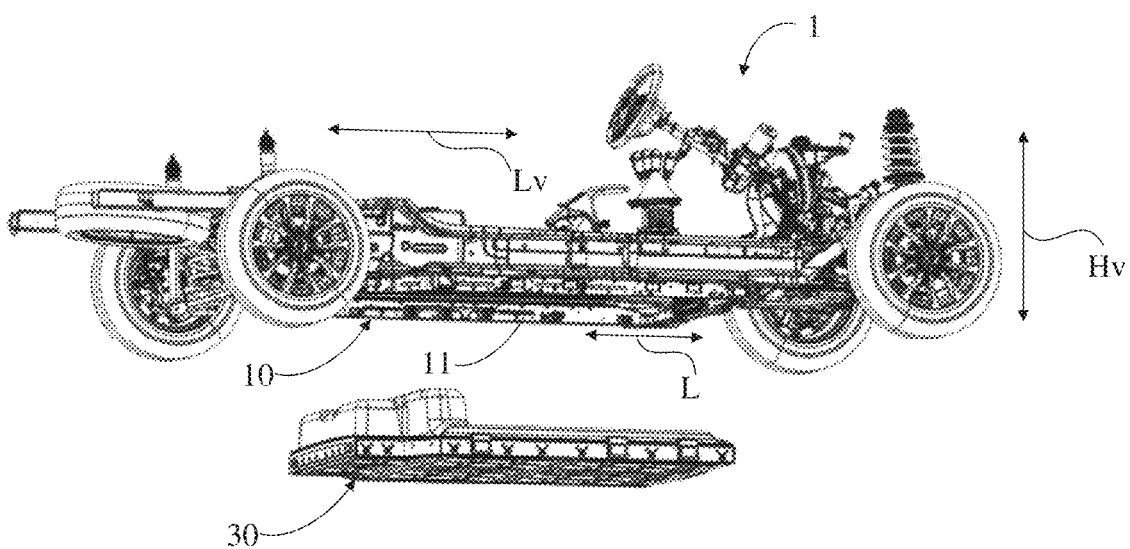
FIG. 21 is a three-dimensional schematic diagram of FIG. 20.

The present invention further provides an electric vehicle 1, as shown in FIGS. 6, 20 and 21, the electric vehicle 1 includes a battery pack assembly 30 and the battery holder 10 as above, the battery pack assembly 30 is mounted on the battery holder 10. In the present embodiment, the electric vehicle 1 further includes a chassis (not shown), and the battery holder 10 is fixed on the chassis.

Figure 7:
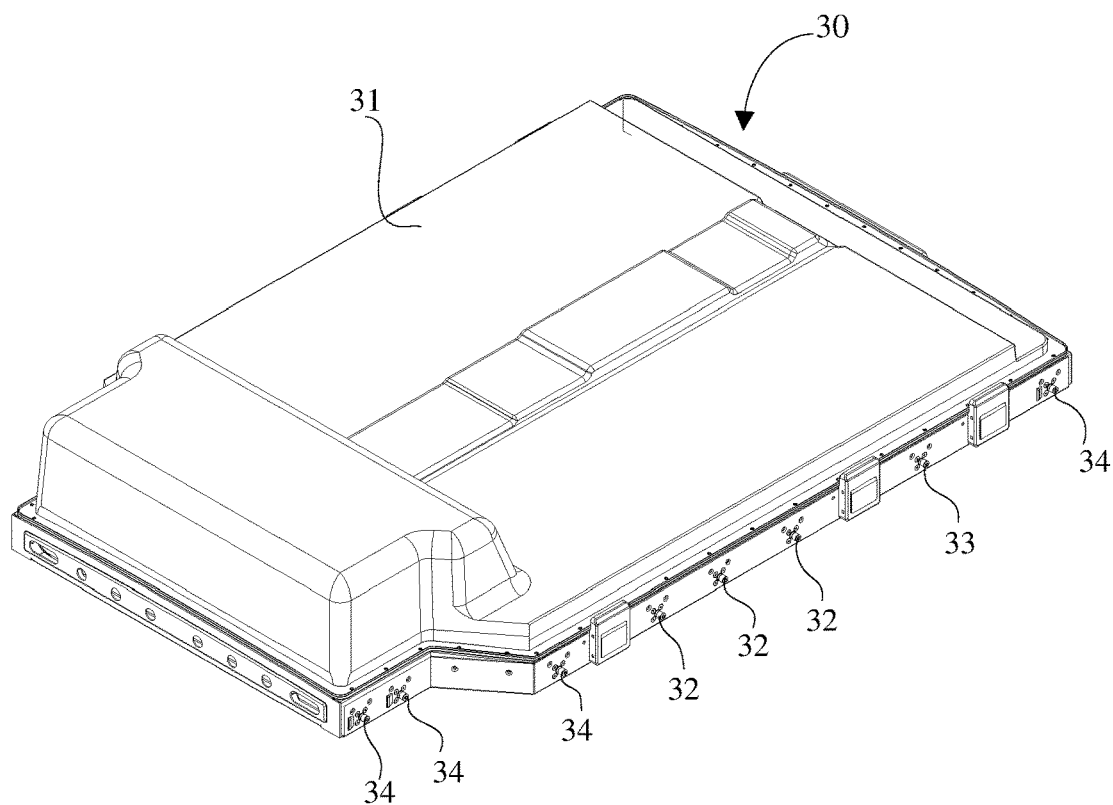
FIG. 7 is a schematic perspective diagram of the battery pack assembly of the electric vehicle according to the first embodiment of the present invention.

As shown in FIG. 7, the battery pack assembly 30 includes the battery pack 31 and the locking shaft (in the present embodiment, the locking shaft comprises a primary locking shaft 32 and a secondary locking shaft 33), the locking shaft is mounted on the battery pack 31. The locking shaft is located in the lock mechanism (in the present embodiment, the primary locking shaft 32 is located in the primary lock mechanism 12, the secondary locking shaft 33 is located in the secondary lock mechanism 13).

The battery pack assembly 30 further includes a plurality of supporting portion 34, the plurality of supporting portion 34 are mounted on the battery pack 31 and are provided in one-to-one correspondence with the plurality of support devices 14, the supporting devices 14 are used to support the corresponding supporting portion 34.

The electric vehicle 1 with the battery holder 10 as above, on the basis of assembling the lock mechanisms and the locking shafts to lock the battery pack 31, the plurality of the supporting portions 34 are mounted on the battery pack 31 to match the plurality of supporting devices 14 on the fixing bracket 11, the weight of the battery pack 31 can be simultaneously distributed on the plurality of supporting devices 14 and the lock mechanisms, the force of the fixing bracket 11 is more evenly, the force applied by the battery pack 31 to the lock mechanism is reduced, the force concentration of the lock mechanism on the fixing bracket 11 is prevented, the service life of the lock mechanism is improved, so as to improve safety performance, and to improve the connection strength between the battery pack 31 battery pack assembly 30 and the battery holder 10, so as to improve the safety performance of the electric vehicle 1.

Figure 8:
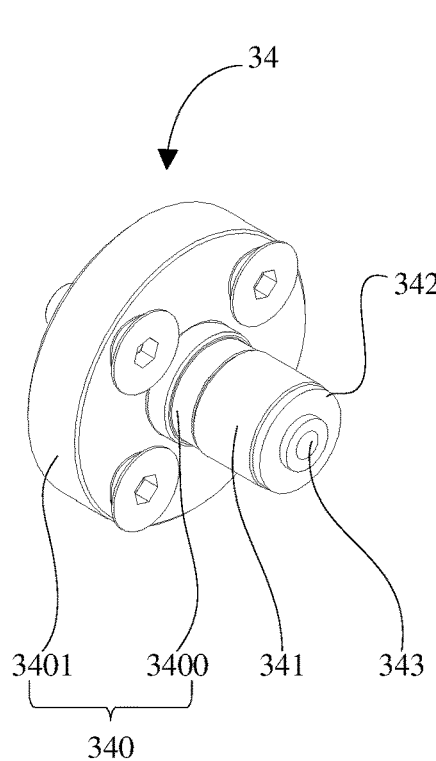
FIG. 8 is a schematic perspective diagram of the supporting portion of the battery pack assembly of the electric vehicle according to the first embodiment of the present invention.
Figure 9:
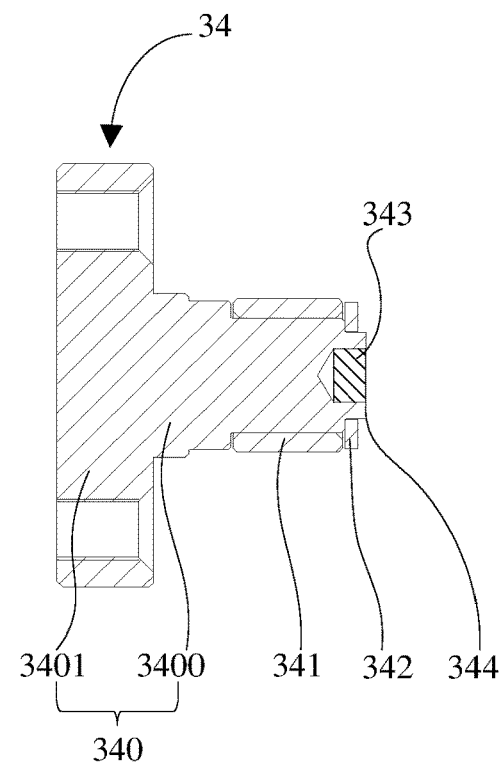
FIG. 9 is a schematic internal diagram of the supporting portion of the battery pack assembly of the electric vehicle according to the first embodiment of the present invention.

As shown in FIG. 5 and FIGS. 8-9, the supporting portion 34 includes the supporting shaft 340, the supporting shaft 340 is pressed in the supporting base 140 and located in the supporting groove 142. When the locking shaft enters the opening (in the present embodiment, the primary locking shaft 32 enters the primary opening 123, and the secondary locking shaft 33 enters the secondary opening 132), the supporting shaft 340 enters the supporting opening 141, when the locking shaft enters the cavity of the lock mechanism (in the present embodiment, the primary locking shaft 32 enters the primary cavity 124 of the primary lock mechanism 12, the secondary locking shaft 33 enters the secondary cavity 133 of the secondary lock mechanism 13), the supporting shaft 340 of the battery pack 31 enters the supporting groove 142 of the battery holder 10, and when the locking is in place, the supporting shaft 340 is also pressed in the supporting groove 142 of the supporting base 140, so that the battery pack 31 can be more firmly fixed in the fixing bracket 11.

In addition, the supporting portion 34 further includes a shaft sleeve 341, the shaft sleeve 341 is rotatably sleeved on the supporting shaft 340. The shaft sleeve 341 is rotatably sleeved on the supporting shaft 340, so that the shaft sleeve 341 can roll, thus ensuring multiple installations, reducing wear and improving the service life of the supporting portion 34. The preferable material of the shaft sleeve 341 is elastic material.

In a preferred embodiment, the supporting portion 34 further comprises a gasket 342, the gasket 342 is sleeved on the supporting shaft 340 and pressed on one end of the shaft sleeve 341. The supporting shaft 340 comprises a shaft body 3400 and a flange portion 3401, the flange portion 3401 is coaxially arranged at one end of the shaft body 3400, the shaft sleeve 341 is sleeved on the shaft body 3400, the flange portion 3401 is detachably connected to the battery pack 31.

Further preferably, the supporting shaft 340 is provided with an electromagnetic induction component 343. The electromagnetic induction component 343 is preferably magnetic steel. One end of the supporting shaft 340 far from the battery pack 31 is provided with a concave part 344, and the electromagnetic induction element 343 is located in the concave part 344. And the electromagnetic induction component 343 is on the same plane with the two ends of the supporting shaft 340 far away from the battery pack 31.

An upper-position sensor acts on the electromagnetic induction component 343 to detect whether the supporting portion 34 of the battery pack 31 has passed through the supporting opening 141. Thus, it can be determined whether the battery pack 31 is installed in place relative to the battery holder 10 in the height direction of the electric vehicle Hv.

A front-position sensor acts on the electromagnetic induction component 343 to detect whether the supporting portion 34 of the battery pack 31 has entered the front end of the supporting groove 142. Thus, it can be determined whether the battery pack 31 is installed in place relative to the battery holder 10 in the length direction of the electric vehicle Lv, so that the electric vehicle can be ensure to be driven under the condition that the battery pack 31 is installed in place and improve the safety of the electric vehicle 1.

Then, mainly refer to FIGS. 4-5 and FIG. 7, the working process of the secondary lock mechanism 13 and the supporting device 14 is briefly described, mainly including an unlocking process and a locking process, in which the initial state is the locking state.

The locking process: the secondary locking shaft 33 moves upward under the action of an external force and enters the secondary cavity 133 through the secondary opening 132. The secondary locking shaft 33 acts on the secondary locking tongue 130 to make the secondary locking tongue 130 rotate counterclockwise, at the same time, the supporting portion 34 moves upward under the action of an external force and enters the supporting groove 142 through the support opening 141; the secondary locking tongue 130 acts on the secondary reset part 134 to make the elastic force of the secondary reset part 134 changed; after the secondary locking tongue 130 is rotated to a certain angle, a channel for the secondary locking shaft 33 to pass through is formed in the secondary cavity 133, the secondary locking shaft 33 can move from back to front, and at the same time, the supporting portion 34 can move from back to front in the supporting groove 142; until the secondary locking shaft 33 is no longer in contact with the secondary locking tongue 130, the secondary locking tongue 130 rotates clockwise under the action of the reset part to reset to the locked state. When the secondary locking shaft 33 is locked in place, the supporting portion 34 is also installed in place.

The unlocking process: a force is applied to the secondary locking tongue 130 to make the secondary locking tongue 130 rotate counterclockwise; the secondary locking tongue 130 acts on the secondary reset part 134 to change the elastic force of the secondary reset part 134; after the secondary locking tongue 130 rotates to a certain angle, a channel for the secondary locking shaft 33 to pass through in the secondary cavity 133 is formed; the secondary locking shaft 33 can move from front to back, then moves downward through the secondary opening 132 to leave the secondary lock mechanism 13, at the same time, the supporting portion 34 can move from front to back in the supporting groove 142, and then moves downward through the supporting opening 141 to leave the supporting device 14.

Embodiment 2

Figure 10:
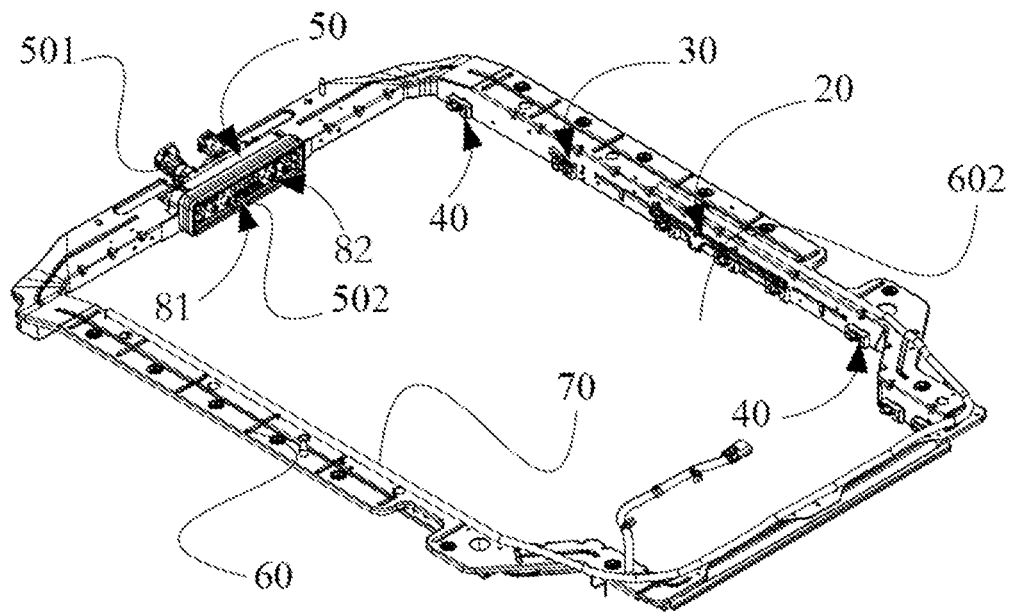
FIG. 10 is a partial schematic diagram of the power transfer device according to the second embodiment of the present invention.
Figure 11:
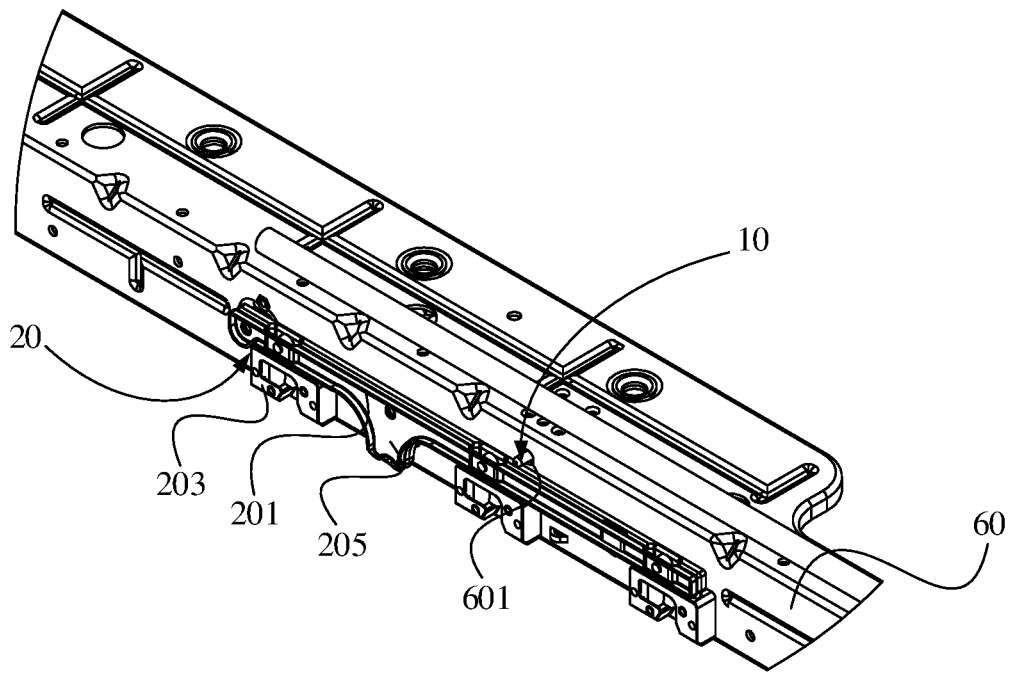
FIG. 11 is another partial schematic diagram of the power transfer device according to the second embodiment of the present invention.

The present embodiment discloses a power transfer device for power exchange of an electric vehicle 1. As shown in FIG. 10 and FIG. 11, the power transfer device includes a battery pack holder 60 (the battery pack holder corresponds to the battery holder in embodiment 1) and an electrical connector of the vehicle side of vehicle side 50. The fixing bracket of the battery pack holder forms a battery pack containment cavity 602 for containing the battery pack (not shown in the figure), two sides of the battery pack are provided with locking shafts, and the lock mechanism is fixed on two sides of the battery pack containment cavity 602. The electrical connector of the vehicle side 50 is arranged on one side of the electrical connector of the battery side facing the battery pack in the battery pack containment cavity 602. When the locking shaft of the battery pack rises along the height direction of the battery pack in place in the lock mechanism, the distance between the locking shaft and the lock point along the length of the battery pack in the lock mechanism is greater than the gap between the electrical connector of the battery side and the electrical connector of the vehicle side 50 along the length direction of the battery pack. When the locking shaft reaches the locking point of the lock mechanism, the electrical connector of the battery side and the electrical connector of the vehicle side 50 are under interference fit.

In the present embodiment, when the locking shaft of the battery pack is locked in place in the lock mechanism, the electrical connector of the battery side can be reliably connected with the electrical connector of the vehicle side 50, so as to improve the reliability and efficiency of battery exchange of the electric vehicle by using the battery transfer device.

For ease of description, the distance between the locking shaft and the lock point along the length of the battery pack in the lock mechanism is called a first distance, and the gap between the high-voltage pole of the electrical connector of the battery side and the high-voltage pole of the electrical connector of the vehicle side 82 along the length direction of the battery pack is called a second distance. In the present embodiment, the height of the low-voltage pole of the electrical connector of the vehicle side 81 is lower than the height of the high-voltage pole of the electrical connector of the vehicle side 82, and the height difference between the low-voltage pole of the electrical connector of the vehicle side 81 and the high-voltage pole of the electrical connector of the vehicle side 82 is less than or equal to the difference between the first distance and the second distance.

In the present embodiment, the relationship between the height difference and the difference makes that the high voltage is connected before the low voltage is connected when the electrical connector of the vehicle side 50 is connected with the electrical connector of the battery end. As long as the low voltage contacts, a contactor control switch in the battery pack can output high voltage. In addition, when the connection between the electrical connector of the vehicle side 50 and the electrical connector of the battery is disconnected, the low-voltage firstly disconnects the high-voltage, so as to prevent the pole arcing sintering and other adverse phenomena from happening due to the high-voltage not being disconnected. Preferably, the range of height difference between the low-voltage pole of the electrical connector of the vehicle side 81 and the high-voltage pole of the electrical connector of the vehicle side 82 is 0-2 mm. In the present embodiment, the height difference between the low-voltage pole of the electrical connector of the vehicle side 81 and the high-voltage pole of the electrical connector of the vehicle side 82 is 1 mm.

It should be noted that on the basis that the electrical connector of the vehicle side 50 and the electrical connector of the battery side can be realized, the height difference between the low-voltage pole of the electrical connector of the vehicle side 81 and the high-voltage pole of the electrical connector of the vehicle side 82 can be any value between 0 and the difference between the first distance and the second distance.

In other alternative embodiments, it can also be set as: the height of the low-voltage pole of the electrical connector of the battery side is lower than the height of the high-voltage pole of the electrical connector of the battery side, and the height difference between the low-voltage pole of the electrical connector of the battery side and the high-voltage pole of the electrical connector of the battery side is less than or equal to the difference between the first distance and the second distance.

In another alternative embodiment, it can also be set as: the height of the low-voltage pole of the electrical connector of the vehicle side 81 is lower than the height of the high-voltage pole of the electrical connector of the vehicle side 82, and the height of the low-voltage pole of the electrical connector of the battery side is lower than the height of the high-voltage pole of the electrical connector of the battery side; the sum of the height difference between the low-voltage pole of the electrical connector of the vehicle side 81 and the high-voltage pole of the electrical connector of the vehicle side 82 and the height difference between the low-voltage pole of the electrical connector of the battery side and the high-voltage pole of the electrical connector of the battery side is less than or equal to the difference between the first distance and the second distance.

In the present embodiment, the connection between the electrical connector of the battery side and the electrical connector of the vehicle side is floating electrical connection, the high-voltage pole of the electrical connector of the vehicle side 82 in FIG. 10 has an electrical contact end 502 and a wiring terminal 501, wherein the end face of the electrical contact end 502 of the high-voltage pole is provided with a groove (not shown in the figure), the groove is concave inwards along the axial direction of the high-voltage pole, the groove is embedded with a conductive elastic part (not shown in the figure), and the conductive elastic part protrudes from a contact surface of the electrical contact end 502. Preferably, the conductive elastic part is a conductive spring. In addition, the electrical connector of the vehicle side 50 includes a flexible electrical connector (not shown in the figure) and a high-voltage plug, one end of the flexible electrical connector is floating electrically connected with the wiring terminal 501 of the high-voltage pole. The high-voltage plug is floating electrically connected with the other end of the flexible electrical connector.

In the present embodiment, the lock mechanism includes a locking base, the locking base is provided with an opening and a cavity extending from the opening, the opening is used for the locking shaft to enter the cavity. The battery pack holder 60 is provided with an upper-position accommodating cavity which is located above the opening, the upper-position accommodating cavity is provided with an upper-position sensor, the upper-position sensor is used to detect whether the locking shaft has passed through the opening, and has installed in place in the lock mechanism along the height direction of the battery pack. The battery pack holder 60 is further provided with a front-position accommodating cavity, which is located at the front end of the cavity, the front-position accommodating cavity is provided with a front-position sensor, the front-position sensor is used to detect whether the locking shaft has entered the front end of the cavity, and has installed in place in the lock mechanism along the length direction of the battery pack.

In the present embodiment, the upper-position sensor can detect whether the locking shaft rises in place in the lock mechanism, the front-position sensor can detect whether the locking shaft locks in place in the front end of the cavity and reaches the locking point, the upper-position sensor and the front-position sensor can improve the locking reliability of the battery pack, which is conducive to improving the electricity connection of the electrical connector of the vehicle side 50 and the electrical connector of the battery side, and further to improve the reliability of the electric vehicle power exchange.

As shown in FIG. 10, the battery pack holder 60 is further provided with a wire harness 70, which is used to transmit the upper-position signal detected by the upper-position sensor and the front-position signal detected by the front-position sensor to the power transfer equipment.

Referring to FIG. 10 and FIG. 11, two lock mechanisms are arranged on both sides of the battery pack holder 60 in the length direction of the battery pack holder, and the two lock mechanisms on the same side of the battery pack holder 60 are arranged at intervals, and the two lock mechanisms are respectively a primary lock mechanism and a secondary lock mechanism. The electrical connector of the vehicle side 50 is arranged on one side wall of the battery pack holder 60 along the width direction of the battery pack holder 60. The length direction of the battery pack holder 60 is parallel to the length direction of the battery pack. When the primary lock mechanism 20 fails, the secondary lock mechanism 30 functions to lock the locking shaft of the battery pack and prevent the battery pack from falling off, which is conducive to further improving the reliability of electric vehicle power exchange.

Figure 12:
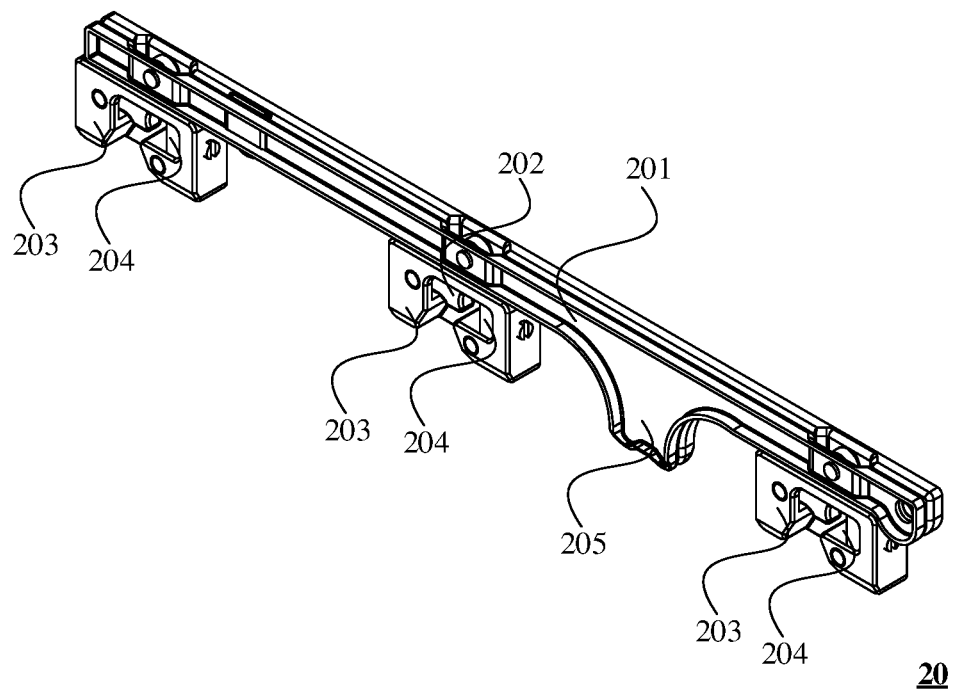
FIG. 12 is a schematic structure diagram of the primary lock mechanism of the power transfer device according to the second embodiment of the present invention.

Referring to FIGS. 10-12, the primary lock mechanism 20 includes a locking link 201, at least one primary locking tongue 202, at least one primary locking base 203, the primary locking base 203 is fixed on the battery pack holder 60, the primary locking base 203 is provided with a primary opening and a primary cavity 204 extending from the primary opening, the primary opening is used for the primary locking shaft of the battery pack to enter the primary cavity 204, and the locking link 201 is rotatably connected with at least one primary locking tongue 202 to drive the primary locking tongue 202 to rotate under the action of external force, so that the primary locking tongue 202 can rotate relative to the primary locking base 203 to change between a primary unlocking state and a primary locking state, when the primary locking tongue 202 is in the primary unlocking state, the primary locking tongue 202 can prevent the primary locking shaft from leaving the primary cavity 204 from the primary opening. One side of the locking link 201 toward the primary locking base 203 is further provided with an unlocking block 205, the unlocking block 205 is an arc convex formed outward from the locking link 201, and the top of the unlocking block 205 is an inner arc groove concave into the locking link 201. In the present embodiment, the number of the primary locking tongue 202 and the number of the primary locking base 203 are both three.

Figure 13:
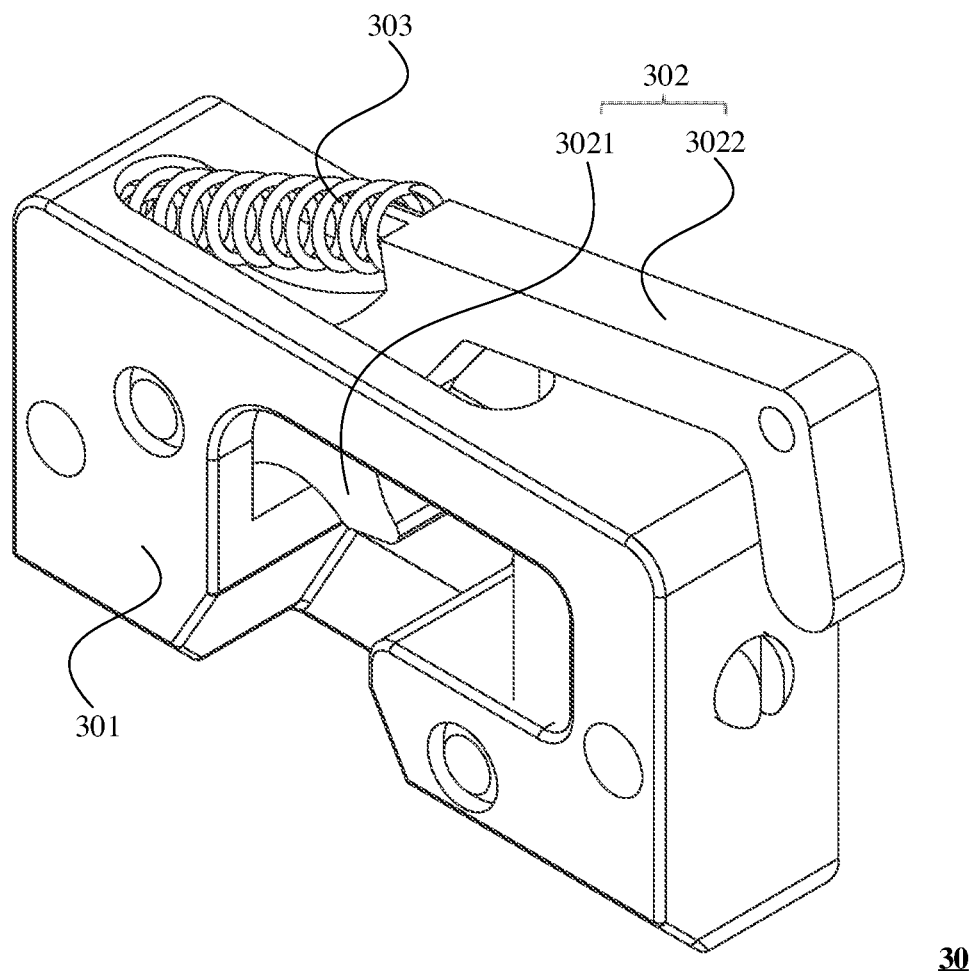
FIG. 13 is a schematic structure diagram of the secondary lock mechanism of the power transfer device according to the second embodiment of the present invention.
Figure 14:
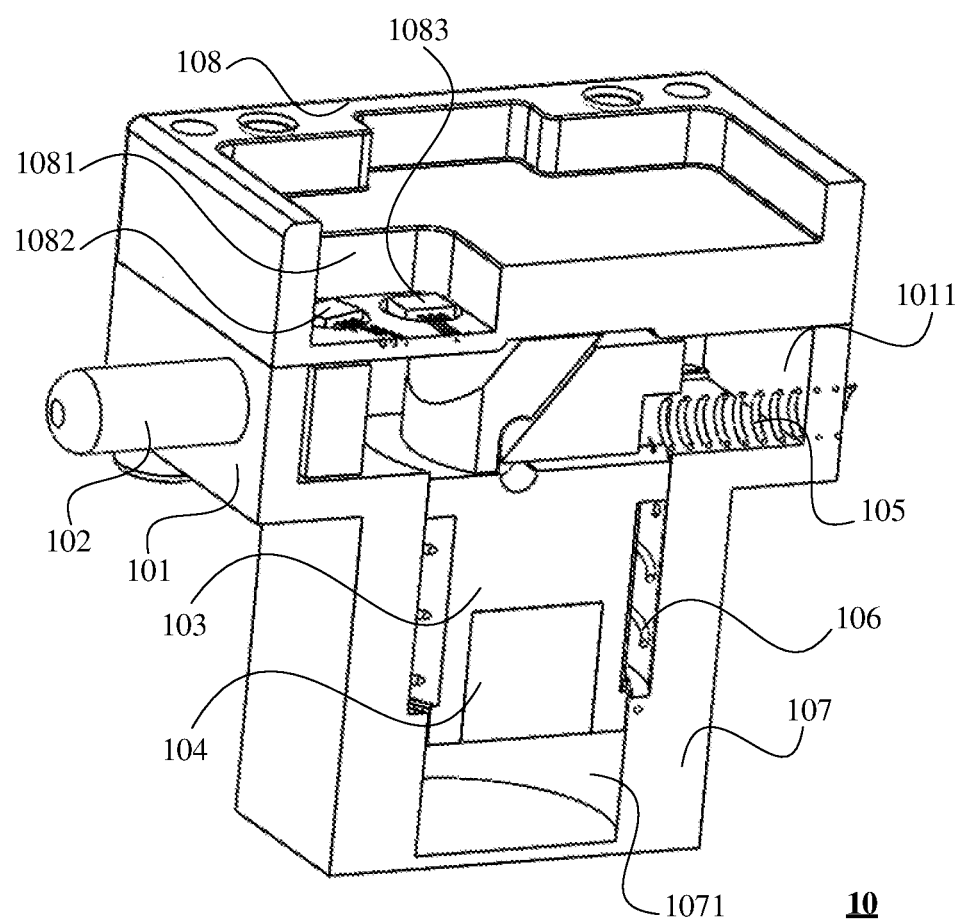
FIG. 14 is a schematic sectional diagram of the locking protection mechanism of the power transfer device according to the second embodiment of the present invention, wherein the locking pin is in the extended state.
Figure 15:
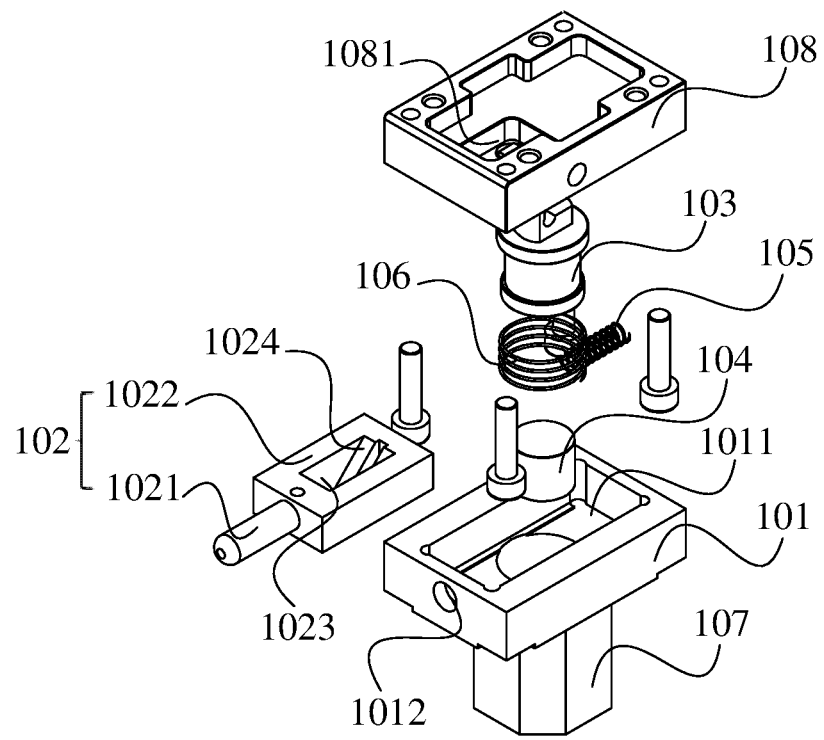
FIG. 15 is a schematic diagram of the exploded structure of the locking protection mechanism of the power transfer device according to the second embodiment of the present invention.
Figure 16:
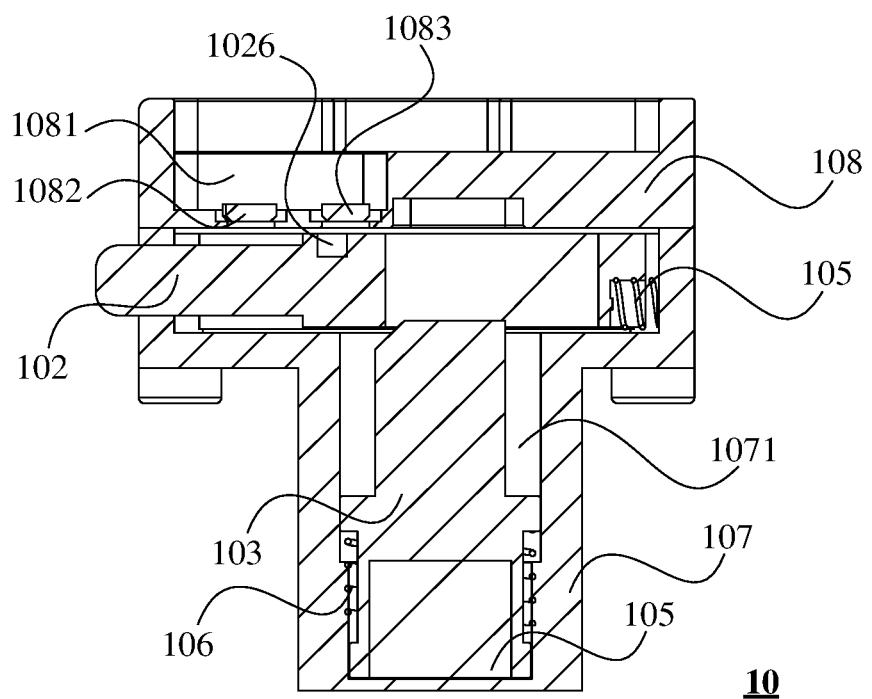
FIG. 16 is another schematic sectional diagram of the locking protection mechanism of the power transfer device according to the second embodiment of the present invention, wherein the locking pin is in the retracted state.
Figure 17:
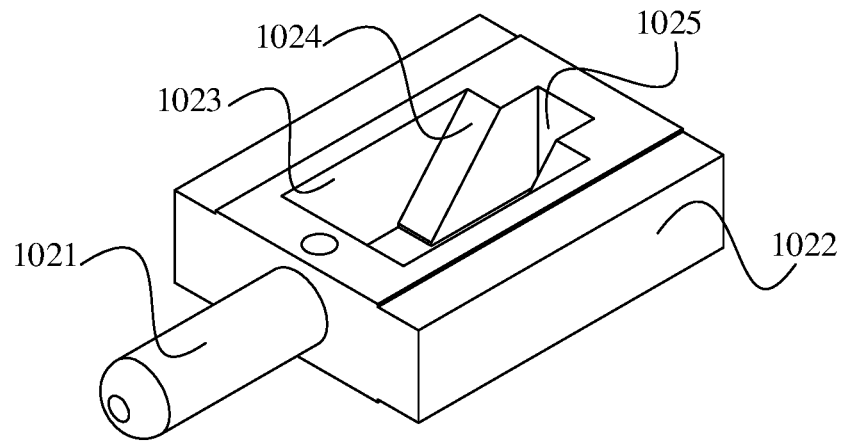
FIG. 17 is a schematic structure diagram of the locking pin of the locking protection mechanism according to the second embodiment of the present invention.
Figure 18:
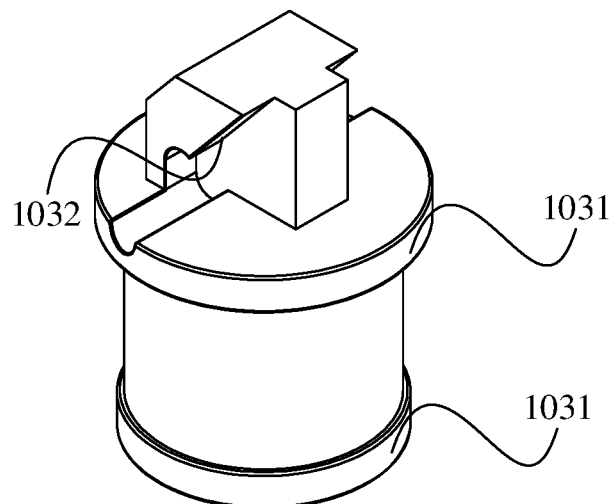
FIG. 18 is a schematic structure diagram of the driving pin of the locking protection mechanism according to the second embodiment of the present invention.

Referring to FIG. 10 and FIG. 13, the secondary lock mechanism 30 includes a secondary locking base 301, a secondary locking tongue 302 and a secondary reset part 303. Wherein, the secondary locking base 301 is fixed on the battery pack holder 60, the secondary locking base 301 is provided with a secondary opening 3011 and a secondary cavity 3012 extending from the secondary opening 3011, and the secondary opening 3011 is used for the secondary locking shaft of the battery pack to enter the secondary cavity 3012. The secondary locking tongue 302 can rotate relative to the secondary locking base 301 to change between a secondary unlocking state and a secondary locking state. The secondary locking tongue 302 includes a secondary locking tongue body 3021 and a secondary locking tongue extension portion 3022, the secondary locking tongue body 3021 and the secondary locking tongue extension portion 3022 are fixedly connected, the secondary locking tongue extension portion 302 is located outside the secondary locking base 301. When the secondary locking tongue 302 is in the secondary locking state, the secondary locking tongue body 3021 can prevent the secondary locking shaft from leaving the secondary cavity 3012 from the secondary opening 3011. The secondary reset part 303 is arranged on the secondary locking base 301 and acts on the secondary locking tongue 302, the secondary reset part 303 is capable of elastic deformation, the secondary reset part 303 is used to rotate the secondary locking tongue 302 in a locking direction to reset from the secondary unlocking state to the secondary locking state.

Referring to FIG. 10, FIG. 11 and FIGS. 14-16, the power transfer device further includes a locking protection mechanism 10. The locking protection mechanism 10 is fixed on the side opposite to the primary lock mechanism on the battery pack holder 60, and the locking protection mechanism 10 is arranged on the moving path of the locking link 201 to limit the movement of the locking link 201 relative to the primary locking base 203. The locking protection mechanism 10 can move between a first position and a second position relative to the locking link 201. When the locking protection mechanism 10 is in the first position, the locking protection mechanism 10 acts on the locking link 201 to limit the movement of the locking link 201 relative to the primary locking base 203; when the locking protection mechanism 10 is in the second position, the locking protection mechanism 10 is separated from the locking link 201 to allow the movement of the locking link 201 relative to the primary locking base 203.

When the primary lock mechanism 20 locks the locking shaft, the locking protection mechanism 10 can limit the movement of the locking link 201 relative to the primary locking base 203, thereby improving the locking effect of the primary lock mechanism 20, so that the primary lock mechanism 20 can lock the locking shaft reliably. Furthermore, it is beneficial to improve the reliability of electric vehicle.

Understand with reference to FIG. 11 and FIGS. 14-18, the locking protection mechanism 10 includes a first lower housing 101 and a locking pin 102. The first lower housing 101 can be detachably connected to a side opposite to the locking shaft in the primary locking base 203, the inner part of the first lower housing 101 has a first holding cavity 1011, and the side wall of the lower housing has a through hole 1012 communicated with the first holding cavity 1011. The locking pin 102 is located in the first holding cavity 1011, and the locking pin penetrates in the through hole 1012, and can switch between an extended state and a retracted state. Wherein, when the locking pin 102 is in the extended state, the locking pin 102 is in the first position; when the locking pin 102 is in the retracted state, the locking pin 102 is in the second position. The switching of the locking pin 102 between the first position and the second position is realized by controlling the extension and retraction of the locking pin 102, which is simple in structure and easy to realize. In addition, as shown in FIG. 2, a hole 601 is arranged on the battery pack holder 60, and the locking pin 102 switches between the first position and the second position through the hole 601.

The locking protection mechanism 10 further includes a driving pin 103, a first electromagnetic induction component 104 and a first elastic element 105. The driving pin 103 acts on the locking pin 102, and the driving pin 103 can move relative to the locking pin 102 to be engaged with or separate from the locking pin 102. The first electromagnetic induction component 104 is arranged on the driving pin 103, the first electromagnetic induction component 104 is used to drive the driving pin 103 to exert a force on the locking pin 102 along the retraction direction of the locking pin 102 under an action of an external electromagnetic equipment. The first elastic element 105 is connected to one end of the locking pin 102 far away from the cavity, the first elastic element 105 is abutted between the locking pin 102 and the inner wall surface of the first holding cavity 1011, and the first elastic element 105 is used to apply a force to the locking pin 102 in the extending direction of the locking pin 102. When the first electromagnetic induction component 104 is engaged with the external electromagnetic device, the driving pin 103 is separated from the locking pin 102, and a force is applied to the locking pin 102 along the retraction direction to make the locking pin 102 in the retracted state; when the first electromagnetic induction component 104 is separated from the external electromagnetic device, the first elastic element 105 exerts a force on the locking pin 102 in the extension direction, and the driving pin 103 is engaged with the locking pin 102, so that the locking pin 102 is in the extended state.

In the present embodiment, when the first electromagnetic induction component 104 is engaged with an external electromagnetic device, the driving pin 103 moves away from the locking pin 102, and a force is applied to the locking pin 102 along the retraction direction, so that the locking pin 102 retracts, and the locking pin 102 will squeeze the first elastic element 105. When the driving pin 103 is completely separated from the locking pin 102, the first elastic element 105 provides a restoring force to the locking pin 102 to return the locking pin 102 to a position for engagement with the driving pin 103. When the first electromagnetic induction component 104 is separated from the external electromagnetic device, the driving pin 103 moves in a direction toward the locking pin 102 to engage with the locking pin 102, so that the locking pin 102 is in the extension state. In addition, in the present embodiment, the magnetic engagement method is used to control the engagement and separation of the driving pin 103 and the locking pin 102, and then to control the extension and retraction of the locking pin 102. The control method is simple and the control efficiency is high.

The locking pin 102 has an executive part 1021 and a connecting part 1022. The connecting part 1022 is connected to one end of the executing part 1021 which is far away from the primary cavity 204, the connecting part 1022 has a second holding cavity 1023 which used for holding the driving pin 103. The first elastic element 105 is connected to the end of the connecting part 1022 far away from the executing part 1021, the first elastic element 105 is butted between the connecting part 1022 and the inner wall surface of the first holding cavity 1011, and the first elastic element 105 exerts a force on the connecting part 1022 in the extending direction. When the driving pin 103 is engaged with the locking pin 102, one end of the driving pin 103 close to the locking pin 102 is clamped to the second holding cavity 1023, which belongs to the embedded connection and occupies less space.

In the present embodiment, a first angle is formed between the length direction of the connecting part 1022 and the height direction of the driving pin 103, and the second holding cavity 1023 extends along the height direction of the driving pin 103, so that the driving pin 103 moves in the height direction of the driving pin 103 relative to the locking pin 102.

The driving pin 103 has a head end and a tail end along its height direction, the head end of the driving pin 103 is embedded in the second holding cavity 1023, and the first electromagnetic induction component 104 is arranged in the tail end of the driving pin 103. The inner wall surface of the second holding chamber 1023 is provided with a first inclined part 1024, and the first end of the driving pin 103 is provided with a second inclined part 1032 adapted to the first inclined part 1024. When the driving pin 103 is engaged with the locking pin 102, the first inclined part 1024 is attached to the second inclined part 1032; when the driving pin 103 is separated from the locking pin 102, the second inclined part 1032 moves downward relative to the first inclined part 1024, and applies a force to the locking pin 102 along the retraction direction, so as to make the locking pin 102 in the retraction state.

In the present embodiment, the engagement of the first inclined part 1024 and the second inclined part 1032 are ingeniously used, when the driving pin 103 moves in a direction away from the locking pin 102, the first inclined part 1024 slides relative to the second inclined part 1032. The friction force applied by the first inclined part 1024 to the second inclined part 1032 can be decomposed into a component force along the retraction direction, and under the function of the component force, the locking pin 102 retracts back.

The inner wall surface of the second holding cavity 1023 is further provided with a concave part 1025, and the head end of the driving pin 103 is provided with a convex part which is matched with the concave part 1025. The inner wall surface of the second holding cavity 1023 is provided with two first inclined parts 1024, and the two first inclined parts 1024 are relatively arranged on both sides of the concave part 1025. In the present embodiment, the concave part 1025 can play a limiting role on the driving pin 103, help to make the driving pin 103 reliably engage with the locking pin 102, thus help to realize the stable extension of the locking pin 102, and help to realize the reliable locking of the locking shaft.

The first electromagnetic induction component 104 is embedded in the tail end of the driving pin 103. In this way, the first electromagnetic induction component 104 does not occupy additional space outside the driving pin 103, which is beneficial to improve space utilization. In addition, it is also advantageous to protect the first electromagnetic induction component 104.

In addition, the tail end of the driving pin 103 is sleeved of a second elastic element 106, the second elastic element 106 exerts a force on the driving pin 103 in a direction close to the connecting part 1022, wherein the force exerted by the second elastic element 106 on the driving pin 103 is greater than the gravity of the driving pin 103. In this present embodiment, when the driving pin 103 is engaged with the locking pin 102, the force applied by the second elastic element 106 to the driving pin 103 can prevent the driving pin 103 from falling under the action of gravity, thus further improving the reliability of the engagement of the driving pin 103 and the locking pin 102. When the driving pin 103 is required to move towards the direction close to the locking pin 102, the force applied by the second elastic element 106 to the driving pin 103 can overcome the gravity of the driving pin 103, so that the driving pin 103 can move towards the direction close to the locking pin 102 more reliably.

The locking protection mechanism 10 further includes a second lower housing 107, the second lower housing 107 is connected to the bottom of the first lower housing 101, the second lower housing 107 has a third holding cavity 1071, the third holding cavity 1071 is intercommunication with the first holding cavity 1011, and the driving pin 103 is located in the third holding cavity 1071. A second angle is formed between the central axis of the second lower housing 107 and the central axis of the first lower housing 101, and the second angle is equal to the first angle.

In addition, the outer wall surface of the driving pin 103 is provided with a blocking part 1031 corresponding to both ends of the second elastic element 106, and the second elastic element 106 is clamped between the two blocking parts 1031. That is to say, in the present embodiment, the second elastic element 106 is integrally sleeved on the outer wall surface of the driving pin 103, and the second elastic element 106 is a spring. The main function of the blocking part 1031 is to locate the second elastic element 106 to restrict the movement of the second elastic element 106 along the height direction of the driving pin 103.

In addition, the locking protection mechanism 10 further includes an upper housing 108 which is pressed and detachably connected to the first lower housing 101. The upper housing 108 can fix and protect the locking pin 102, the driving pin 103, etc. The upper housing 108 has a fourth holding cavity 1081, a first sensor 1082 is arranged in the fourth holding cavity 1081, and a second electromagnetic induction component 1026 is arranged on the executive part 1021. Wherein, the first sensor 1082 acts on the second electromagnetic induction component 1026 to detect that the executive part 1021 is in an extended state. The fourth holding cavity 1081 is further provided with a second sensor 1083, the second sensor 1083 acts on the second electromagnetic induction component 1026 to detect that the executive part 1021 is in a retracted state. Compared with the first sensor 1082, the second sensor 1083 is closer to the driving pin 103. Through the first sensor 1082, the second sensor 1083 and the second electromagnetic induction component 1026 can reliably detect when the locking pin 102 is in the extended state and the retracted state, which is conducive to the unlocking and locking of the battery pack by the primary lock mechanism 20. In addition, in the present embodiment, the first electromagnetic induction component 104 and the second electromagnetic induction component 1026 are both magnetic steel.

In addition, in the present embodiment, the locking protection mechanism 10 adopts the method of electromagnetic attraction of the driving pin 103 to realize the extension and retraction of the locking pin 102, and the extension and retraction of the locking pin 102 are in the same linear direction. In other alternative embodiments, the extension and retraction of the locking pin 102 can be realized by other driving modes (non electromagnetic driving modes), the action path of the locking pin 102 can also be set as a curve, and other non locking pin 102 structures, such as crank mechanism and rocker mechanism, can be adopted to realize the switch between the first position and the second position of the locking protection mechanism.

Figure 19:
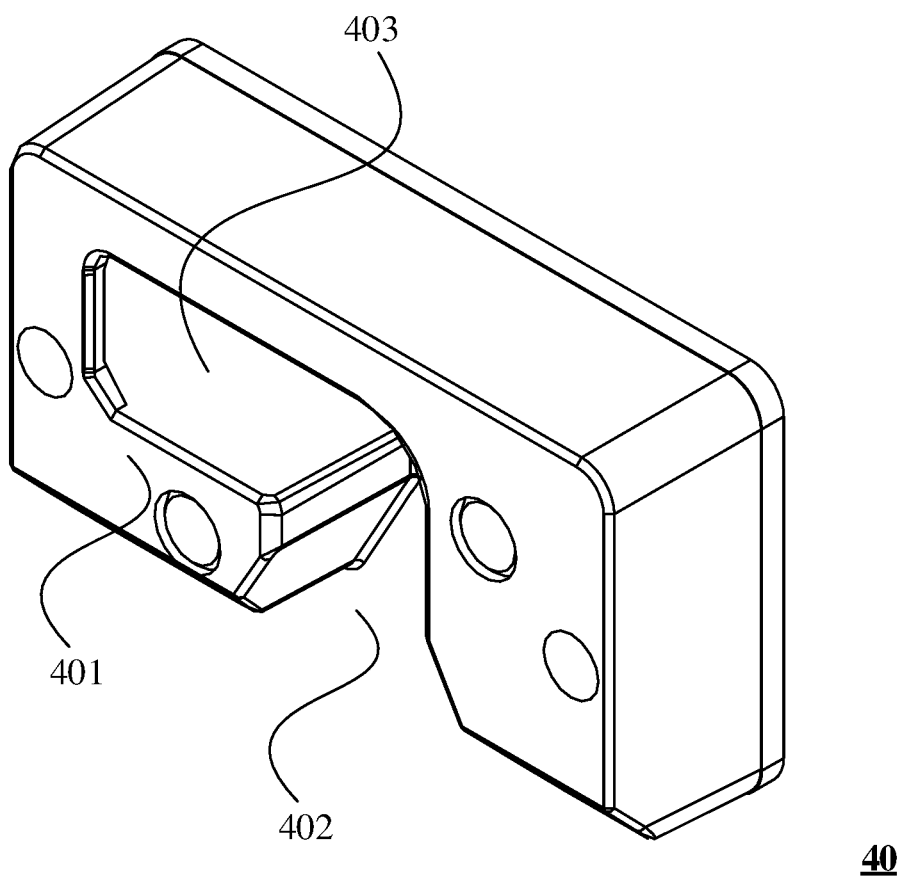
FIG. 19 is a schematic structure diagram of the support structure of the power transfer device according to the second embodiment of the present invention.

Understand with reference to FIG. 11 and FIG. 19, the power transfer device further includes a plurality of support structures 40. The plurality of support structures 40 are fixed on one side of the battery pack holder 60 facing the battery pack, and the plurality of support structures 40 are used to provide a plurality of support points for supporting the battery pack. Specifically, the support structure 40 includes a supporting base 401, the supporting base 401 provided with a supporting base 401 and a supporting groove 403 extending from the supporting opening 402, the supporting opening 402 is used for a support part installed on the battery pack to enter the supporting groove 403. The plurality of support structures 40 are distributed on both sides of the battery pack holder 60 in the length direction of the battery pack holder 60, and the support structures 40 arranged on both sides of the battery pack holder 60 are one-to-one corresponding and relatively arranged. Both sides of the battery pack holder 60 in the length direction of the battery pack holder 60 are provided with a lock mechanism, and the support structure 40 and the lock mechanism on the same side are interval set. The support structure 40 can support the battery pack, facilitate the installation of the battery pack and the battery pack holder 60, and improve the locking effect of the lock mechanism, so as to improve the power exchange reliability of the electric vehicle.

In addition, in the present embodiment, the battery pack holder 60 in FIG. 10 is further provided with a power exchange sensor (not shown in the figure), which is used to sense the power transfer equipment and to control the disconnection of the electrical connection between the electrical connector of the vehicle side 50 and the electrical connector of the battery side. When the battery pack is removed from the battery pack holder 60 by the power transfer equipment, the power exchange sensor can disconnect the electric connection between the electrical connector of the vehicle side 50 and the electrical connector of the battery side, so as to protect the electric vehicle.

The embodiment further discloses an installation method of a power transfer device, which comprises the following steps:

Step 1, install the battery pack from the bottom of the battery pack holder along the height direction of the battery pack into the battery pack holder until the locking shaft rises in place in the lock mechanism along the height direction of the battery pack;

Step 2, move the battery pack forward along its length direction until the locking shaft reaches the locking point in the lock mechanism along the length direction of the battery pack.

According to the power transfer device in the present embodiment, when the locking shaft of the battery pack is locked in place in the lock mechanism, the electrical connector of the battery side can be reliably connected with the electrical connector of the vehicle side, so as to improve the reliability and power exchange efficiency of the electric vehicle using the power transfer device.

Although the specific embodiments of the invention have been described above, those skilled in the art will understand that these are only examples, and various changes or modifications can be made to these embodiments without departing from the principle and essence of the invention. Therefore, the scope of protection of the invention is defined by the appended claims.

What is claimed is:

1. A battery holder, for being mounted on the body of an electric vehicle to fix a battery pack, the battery holder comprises a fixing bracket and a plurality of lock mechanisms, the lock mechanisms are fixed on the fixing bracket, characterized in that the battery holder further comprises:
   a plurality of supporting devices, which are fixed on one side of the fixing bracket facing the battery pack, and the plurality of supporting devices provide a plurality of support points to support the battery pack;
   the fixing bracket has an upper-position accommodation cavity, an upper-position sensor is arranged in the upper-position accommodation cavity, the upper-position sensor is used for detecting the supporting portion of the battery pack, so as to determine whether the battery pack has been installed in place relative to the battery holder in a height direction of the electric vehicle;
   or, the fixing bracket has a front-position accommodation cavity, a front-position sensor is arranged in the front-position accommodation cavity, the front-position sensor is used to detect the supporting portion of the battery pack, so as to determine whether the battery pack is installed in place relative to the battery holder in a length direction of the electric vehicle.

2. The battery holder according to claim 1, characterized in that the lock mechanism includes a locking base, the locking base is provided with an opening and a cavity extending from the opening, the opening is used for one of the locking shafts installed on the battery pack to enter the cavity;
   the supporting device is provided with a supporting groove, a lower surface of the supporting groove is in the same plane with a lower surface of the cavity.

3. The battery holder according to claim 1, characterized in that the supporting device is provided with the supporting groove;
   the supporting device comprises:
   a supporting base, the supporting base is provided with a supporting opening and a supporting groove which extends from the supporting opening, and the supporting opening is used for a supporting portion mounted on the battery pack to enter the supporting groove;
   the upper-position accommodation cavity is located above the supporting opening, the upper-position sensor is used for detecting whether the supporting portion of the battery pack has passed through the supporting opening;
   or, the front-position accommodation cavity is located at the front end of the supporting groove, the front-position sensor is used to detect whether the supporting portion of the battery pack has entered a front end of the supporting groove.

4. The battery holder according to claim 3, characterized in that the supporting device further comprises an elastic part, the elastic part is at least partially located in the supporting groove, and the elastic part is used for abutting against the supporting portion of the battery pack.

5. The battery holder according to claim 3, characterized in that the supporting base is provided with a locating hole, the supporting device further includes a dowel pin, the dowel pin is partially located outside the locating hole, and the dowel pin is in interference fit with the locating hole;

or, the supporting base is provided with a mounting hole, the mounting hole is a threaded hole, the supporting base can be detachably connected to the fixing bracket through the mounting hole;

or, the supporting opening is a bell mouth.

6. The battery holder according to claim 1, characterized in that the plurality of supporting devices are distributed on both sidewalls of the fixing bracket in a length direction of the fixing bracket;

or, both sidewalls of the fixing bracket in a length direction of the fixing bracket are provided with the lock mechanisms, the supporting device and the lock mechanism which are on the same side are arranged at intervals.

7. The battery holder according to claim 6, characterized in that in the length direction of the fixing bracket, both sidewalls of the fixing bracket are both arranged with two lock mechanisms, the two lock mechanisms on the same side of the fixing bracket are arranged at intervals, and are respectively a primary lock mechanism and a secondary lock mechanism;

the primary lock mechanism comprises a locking link, at least one primary locking tongue and at least one primary locking base, the primary locking base is fixed on the fixing bracket, the primary locking base is provided with a primary opening and a primary cavity extending from the primary opening, the primary opening is used for a primary locking shaft installed on the battery pack to enter the primary cavity, the locking link is rotatably connected with the at least one primary locking tongue, the locking link is used to drive the primary locking tongue to rotate under the action of external force, so that the primary locking tongue can rotate relative to the primary locking base to change between a primary unlocking state and a primary locking state, when the primary locking tongue is in the primary locking state, the primary locking tongue can prevent the primary locking shaft from leaving the primary cavity from the primary opening;

or, the secondary lock mechanism comprises:

a secondary locking base, the secondary locking base is fixed on the fixing bracket, the secondary locking base is provided with a secondary opening and a secondary cavity extending from the secondary opening, the secondary opening is used for a secondary locking shaft installed on the battery pack to enter the secondary cavity;

a secondary locking tongue, the secondary locking tongue can rotate relative to the secondary locking base to change between an unlocking state and a locking state, the secondary locking tongue includes a secondary locking tongue body and a secondary locking tongue extension portion which are fixedly connected, the secondary locking tongue extension portion is on the outside of the secondary locking base, when the secondary locking tongue is in the locking state, the secondary locking tongue body can prevent the secondary locking shaft from leaving the secondary cavity from the secondary opening; and, a secondary reset part, the secondary reset part is arranged on the secondary locking base, and the secondary reset part acts on the secondary locking tongue, the secondary reset part is able to be elastically deformed, the secondary reset part is used to rotate the secondary locking tongue in a locking direction to reset from the unlocking state to the locking state.

8. The battery holder according to claim 1, characterized in that the fixing bracket comprises a frame and a temporary connector, one side of the frame in the width direction of the fixing bracket has a bracket opening, and the temporary connector is detachably connected to the portions at the two ends of the bracket opening in the frame, and covers the bracket opening or is located in the bracket opening;

or, the battery holder further includes a quick-change sensor, the quick-change sensor is arranged on the fixing bracket, the quick-change sensor is used to detect the position signal of a power transfer equipment and transmit the position signal to a controller.

9. A power transfer device, characterized in that the power transfer device includes the battery holder according to claim 1, the fixing bracket forms a battery pack containment cavity for containing the battery pack, both sidewalls of the battery pack are provided with locking shafts, and the lock mechanisms are fixed on sidewalls of the battery pack containment cavity, the power transfer device further comprises:

an electrical connector of the vehicle side, the electrical connector of the vehicle side is arranged in the battery pack containment cavity, and the electrical connector of the vehicle side is set opposite to an electrical connector of the battery side of the battery pack, both of the electrical connector of the vehicle side and the electrical connector of the battery side have a plurality of corresponding poles;

wherein when the locking shafts of the battery pack rise in place in the lock mechanisms along a height direction of the battery pack, the distance between each of the locking shafts and a corresponding lock point along the length of the battery pack in the lock mechanisms is greater than a gap between the electrical connector of the battery side and the electrical connector of the vehicle side along a length direction of the battery pack;

when the locking shafts reach the locking point of the lock mechanisms, the pole of the electrical connector of the battery side is abutting against the pole of the electrical connector of the vehicle side.

10. The power transfer device according to claim 9, characterized in that the distance between each of the locking shafts and the corresponding lock point along the length of the battery pack in the lock mechanisms is called a first distance, and the gap between a high-voltage pole of the electrical connector of the battery side and a high-voltage pole of the electrical connector of the vehicle side along the length direction of the battery pack is called a second distance;

the height of the low-voltage pole of the electrical connector of the vehicle side is lower than the height of the high-voltage pole of the electrical connector of the vehicle side, and the height difference between the low-voltage pole of the electrical connector of the vehicle side and the high-voltage pole of the electrical connector of the vehicle side is less than or equal to the difference between the first distance and the second distance;

or, the height of the low-voltage pole of the electrical connector of the battery side is lower than the height of the high-voltage pole of the electrical connector of the battery side, and the height difference between the low-voltage pole of the electrical connector of the battery side and the high-voltage pole of the electrical connector of the battery side is less than or equal to the difference between the first distance and the second distance.

11. The power transfer device according to claim 9, characterized in that the distance between each of the locking shafts and the corresponding lock point along the length of the battery pack in the lock mechanisms is called the first distance, and the gap between a high-voltage pole of the electrical connector of the battery side and a high-voltage pole of the electrical connector of the vehicle side along the length direction of the battery pack is called the second distance;
the height of the low-voltage pole of the electrical connector of the vehicle side is lower than the height of the high-voltage pole of the electrical connector of the vehicle side, and the height of the low-voltage pole of the electrical connector of the battery side is lower than the height of the high-voltage pole of the electrical connector of the battery side;
the sum of the height difference between the low-voltage pole of the electrical connector of the vehicle side and the high-voltage pole of the electrical connector of the vehicle side and the height difference between the low-voltage pole of the electrical connector of the battery side and the high-voltage pole of the electrical connector of the battery side is less than or equal to the difference between the first distance and the second distance.

12. The power transfer device according to claim 9, characterized in that the electrical connector of the vehicle side is used for being in floating electric connection with the electrical connector of the battery side;
the high-voltage pole of the electrical connector of the vehicle side has an electrical contact end and a wiring terminal;
wherein, an end face of the electrical contact end of the high-voltage pole is provided with a groove, the groove is concave inwards along the axial direction of the high-voltage pole, the groove is embedded with a conductive elastic part, and the conductive elastic part protrudes from the contact surface of the electrical contact end.

13. The power transfer device according to claim 9, characterized in that the lock mechanism includes a locking base, the locking base is provided with the opening and the cavity extending from the opening, the opening is used for one of the locking shafts to enter the cavity;
the battery pack holder is provided with an upper-position accommodating cavity, the upper-position accommodating cavity is located above the opening, the upper-position accommodating cavity is provided with an upper-position sensor; the upper-position sensor is used to detect whether the corresponding locking shaft has passed through the opening, and to detect whether the corresponding locking shaft has risen in place in the lock mechanism along the height direction of the battery pack;
or, the battery pack holder is provided with a front-position accommodating cavity, the front-position accommodating cavity is located at the front end of the cavity, the front-position accommodating cavity is provided with a front-position sensor; the front-position sensor is used to detect whether the corresponding locking shaft has entered the front end of the cavity, and to detect whether the corresponding locking shaft has been locked in place in the lock mechanism along the length direction of the battery pack.

14. The power transfer device according to claim 13, characterized in that the power transfer device further includes a locking protection mechanism,
the locking protection mechanism is fixed on the side opposite to the primary lock mechanism on the battery pack holder, and the locking protection mechanism is arranged on the moving path of the locking link to limit the movement of the locking link relative to the primary locking base of the primary lock mechanism;
the locking protection mechanism can move between a first position and a second position relative to the locking link;
wherein when the locking protection mechanism is in the first position, the locking protection mechanism acts on the locking link to limit the movement of the locking link relative to the primary locking base; when the locking protection mechanism is in the second position, the locking protection mechanism is separated from the locking link to allow the movement of the locking link relative to the primary locking base.

15. The power transfer device according to claim 13, characterized in that the battery pack holder is further provided with a wire harness, the wire harness is used to transmit the upper-position signal detected by the upper-position sensor and the front-position signal detected by the front-position sensor to the power transfer equipment.

16. The power transfer device according to claim 9, characterized in that the power transfer device further includes a plurality of support structures,
the plurality of support structures are fixed on one side of the battery pack holder facing to the battery pack, and the plurality of support structures are used to provide a plurality of support points for supporting the battery pack;
the support structure includes:
a supporting base, the supporting base is provided with a supporting opening and a supporting groove extending from the supporting opening, the supporting opening is used for a support part installed on the battery pack to enter the supporting groove.

17. The power transfer device according to claim 9, characterized in that the battery pack holder further includes:
a power exchange sensor, the power exchange sensor is arranged on the battery pack holder, the power exchange sensor is used to detect the power transfer equipment and to control the disconnection of the electrical connection between the electrical connector of the vehicle side and the electrical connector of the battery side.

18. An installation method for the power transfer device according to claim 9, characterized in that the installation method for the power transfer device includes the following steps:
S1. install the battery pack from the bottom of the battery pack holder along the height direction of the battery pack into the battery pack holder until the locking shafts rise in place in the lock mechanisms along the height direction of the battery pack;
S2. move the battery pack forward along its length direction until the locking shafts reach the locking point in the lock mechanisms along the length direction of the battery pack.

19. An electric vehicle, the electric vehicle includes a battery pack assembly, the battery pack assembly includes a battery pack and locking shafts, the locking shafts are mounted on the battery pack, characterized in that the electric vehicle further comprises the battery holder according to claim 1, the battery pack assembly is mounted on the battery holder, the locking shafts are located in the lock mechanisms respectively;

the battery pack assembly further includes a plurality of supporting portion, the plurality of supporting portion are mounted on the battery pack and are provided in one-to-one correspondence with the plurality of support devices, the supporting devices are used to support the supporting portion correspondingly.

20. The electric vehicle according to claim 19, characterized in that the lock mechanism includes a locking base, the locking base is provided with an opening and a cavity extending from the opening, the opening is used for one of the locking shafts to enter the cavity, and be mounted on the cavity;

the supporting device comprises a supporting base, the supporting base is provided with a supporting opening and a supporting groove which extends from the supporting opening, and the supporting opening is used for the supporting portion to enter the supporting groove;

the supporting portion includes a supporting shaft, the supporting shaft is pressed in the supporting base and located in the supporting groove;

the supporting portion further includes a shaft sleeve, the shaft sleeve is rotatably sleeved on the supporting shaft.

21. The power transfer device according to claim 14, characterized in that the locking protection mechanism includes:

a first lower housing, the first lower housing can be detachably connected to a side opposite to the locking shaft in the primary locking base, the inner part of the first lower housing has a holding cavity, and the side wall of the lower housing has a through hole communicated with the holding cavity;

a locking pin, the locking pin is located in the holding cavity, and the locking pin is penetrated in the locking pin, and can switch between an extended state and a retracted state, wherein when the locking pin is in the extended state, the locking pin is in the first position; when the locking pin is in the retracted state, the locking pin is in the second position;

the locking protection mechanism further includes:

a driving pin, the driving pin acts on the locking pin, and the driving pin can move relative to the locking pin under an action of external force to be engaged with or separated from the locking pin;

wherein when the driving pin is separated from the locking pin, a force is applied to the locking pin along the retraction direction to make the locking pin in the retracted state; when the driving pin is engaged with the locking pin, the locking pin is the extended state.

22. The electric vehicle according to claim 20, characterized in that the material of the shaft sleeve is elastic material;

or, the supporting portion further comprises a gasket, the gasket is sleeved on the supporting shaft and pressed on one end of the shaft sleeve;

or, the supporting shaft comprises a shaft body and a flange portion, the flange portion is coaxially arranged at one end of the shaft body, the shaft sleeve is sleeved on the shaft body, the flange portion is detachably connected to the battery pack;

or, the supporting shaft is provided with an electromagnetic induction component, the fixing bracket has an upper-position accommodation cavity, the upper-position accommodation cavity is located above the supporting opening, an upper-position sensor is arranged in the upper-position accommodation cavity acts on the electromagnetic induction component to detect whether the supporting portion of the battery pack has passed through the supporting opening;

or, the fixing bracket has a front-position accommodation cavity, the front-position accommodation cavity is located at the front end of the supporting groove, a front-position sensor is arranged in the front-position accommodation cavity, the front-position sensor acts on the electromagnetic induction component to detect whether the supporting portion of the battery pack has entered the front end of the supporting groove.

\* \* \* \* \*